(12) United States Patent
Coteus et al.

(10) Patent No.: US 6,292,903 B1
(45) Date of Patent: Sep. 18, 2001

(54) SMART MEMORY INTERFACE

(75) Inventors: Paul William Coteus, Yorktown Heights, NY (US); Daniel Mark Dreps, Georgetown, TX (US); Frank Ferraiolo, Essex, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/106,639

(22) Filed: Jun. 29, 1998

Related U.S. Application Data

(60) Provisional application No. 60/052,044, filed on Jul. 9, 1997.

(51) Int. Cl.[7] .................................................... G06F 1/04
(52) U.S. Cl. .................................... 713/401; 713/503
(58) Field of Search .................................... 713/400, 401, 713/500, 503, 600; 711/167, 168, 169

(56) References Cited

U.S. PATENT DOCUMENTS

| | | | |
|---|---|---|---|
| 5,097,489 | * 3/1992 | Tucci | 375/374 |
| 5,577,236 | * 11/1996 | Johnson et al. | 713/400 |
| 5,579,352 | * 11/1996 | Llewellyn | 375/376 |
| 5,615,358 | * 3/1997 | Vogley | 713/501 |
| 6,131,149 | * 10/2000 | Lu et al. | 711/167 |

* cited by examiner

Primary Examiner—Dennis M. Butler
(74) Attorney, Agent, or Firm—Daniel P. Morris, Esq.; Perman & Green, LLP

(57) ABSTRACT

A method and apparatus are disclosed for initiating a start-up operation of a system (1') having a master device (1) and a slave device (14a–14n). The method comprises steps of: A) exercising the slave device (14a–14n) using the master device (1) to determine a temporal range within which temporal relationships of electrical signals need to be set in order to operate the system (1') without error; B) setting the temporal relationships of the electrical signals so as to be within the determined temporal range; and C) storing a record of the determined temporal range, for subsequent use in operating the system (1'). In one embodiment of the invention, the system (1') includes a memory control system of a computer system (1"), and the slave device (14a–14n) includes memory devices of the computer system (1"). The method of the invention substantially compensates for any differences in times of arrival for data being transferred from the master device (1) to the slave device (14a–14n), and vice versa, and thus minimizes the possibility of read/write errors being encountered, while increasing the overall processing speed and efficiency of the system (1').

16 Claims, 16 Drawing Sheets

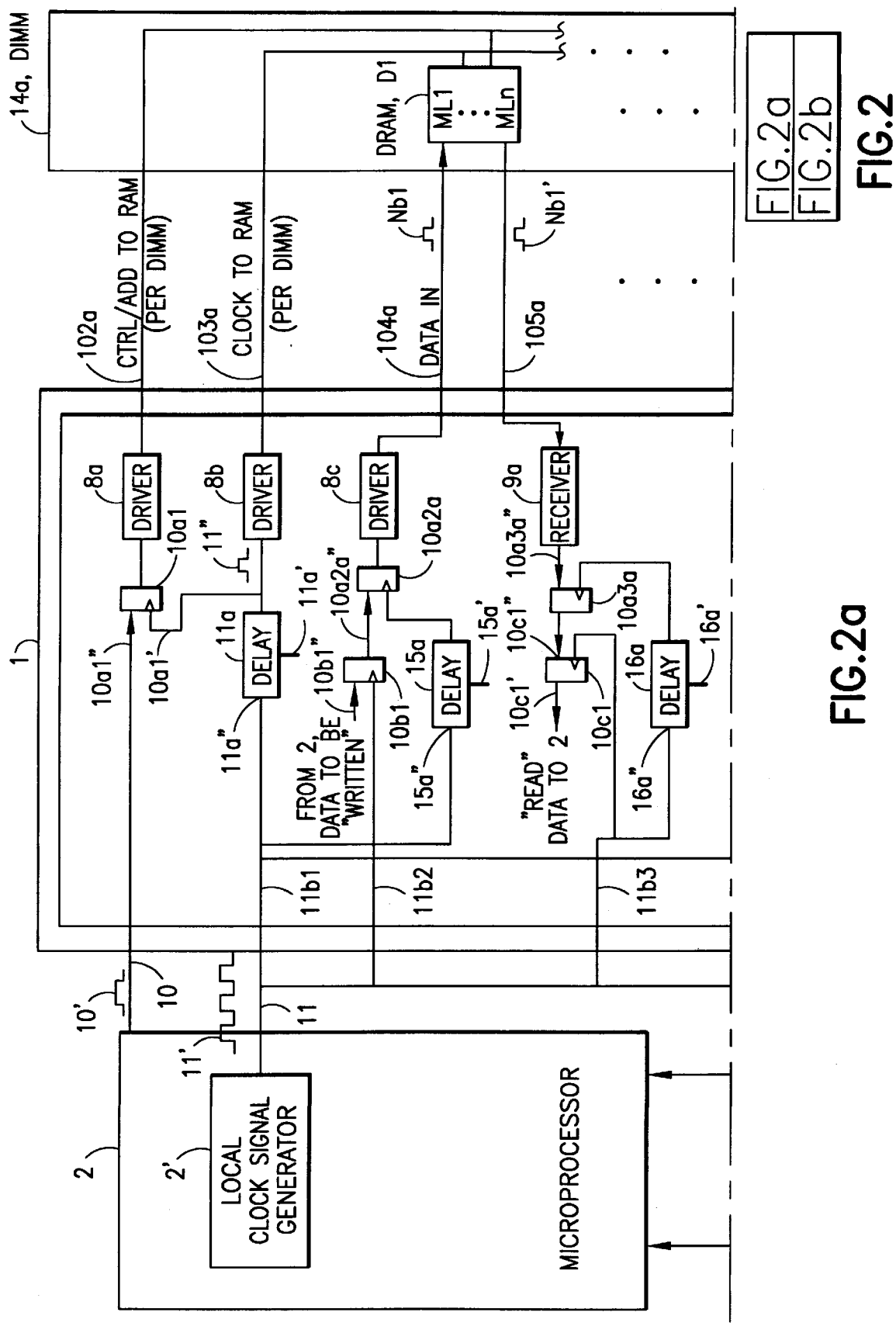

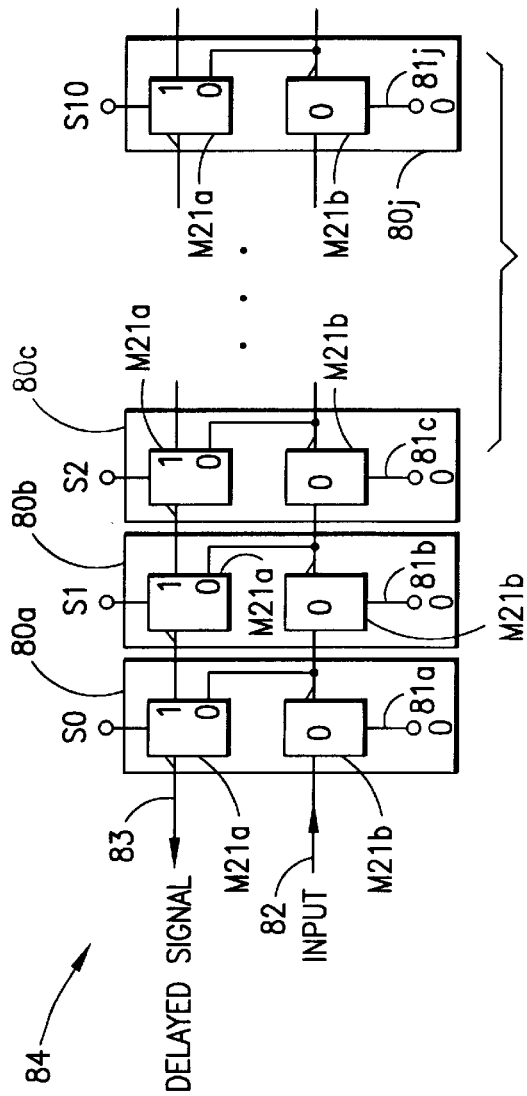
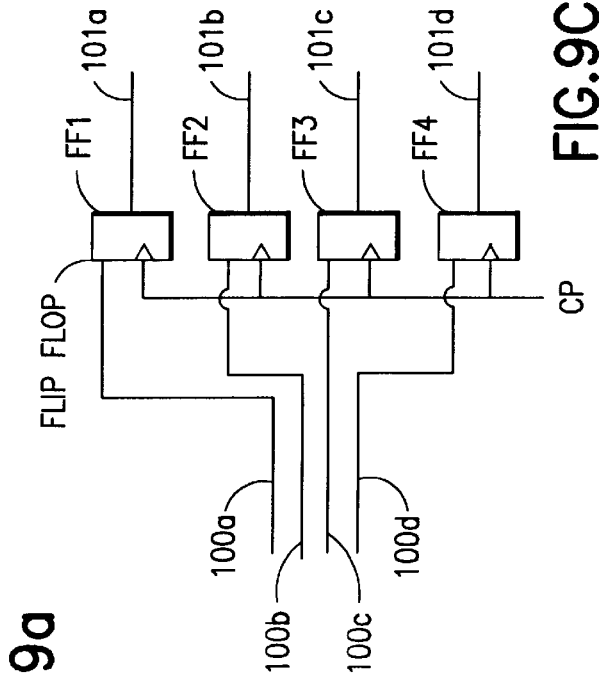
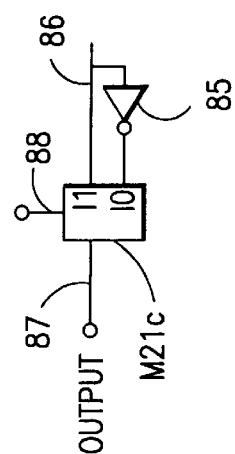
FIG.9a
FIG.9B
FIG.9C

SMART MEMORY INTERFACE

Priority is herewith claimed under 35 U.S.C. 119(e) from copending Provisional Patent Application Ser. No. 60/052,044, filed on Jul. 9, 1997, entitled "Smart Memory Interface", by Paul W. Coteus, Daniel M. Dreps, and Frank D. Ferraiolo. The disclosure of this Provisional Patent Application is incorporated by reference herein in its entirety.

FIELD OF THE INVENTION

This invention relates generally to computer systems, and, in particular, to a technique for optimizing the performance of a memory subsystem of a computer system.

BACKGROUND OF THE INVENTION

In modern computer systems, the need to perform data storage and retrieval operations at high speeds is often critical. Unfortunately, however, these rates can often be limited by, for example, the limited speeds at which at least some conventional memory control systems operate during the performance of such data storage and retrieval operations.

Various factors can limit the speeds at which memory control systems operate. By example, in at least some conventional memory control systems, wherein data is transferred between memory controller and memory device components during 'read' and 'write' operations, there may be differences between the times at which portions of the data arrive at the individual components. These differences may result from, for example, the use of interface buses having different lengths for coupling the memory controller to the memory device components, and/or the presence of variations in the amount of data loading on the buses. Such differences can cause errors to occur during the 'read' and/or 'write' operations, and can limit the operating speed of the memory control system since, for example, a microprocessor of the computer system may need to delay performing an operation until all of the data portions are successfully 'written' to and/or 'read' from the memory.

Reference is now made to FIG. 8, which shows various components of a memory control system (hereinafter referred to as a "memory subsystem") of a conventional computer system. In particular, FIG. 8 shows a memory controller 70 that is coupled to memory devices 55a–55d through buses 54a–54d, respectively. Memory controller 70 is employed for 'writing' data to, and for 'reading' data from, the memory devices 55a–55d through the buses 54a–54d. The memory controller 70 includes 4-bit registers 70a–70d, which are assumed to have a capability for being enabled for a predetermined time period (also referred to as an "enablement period"), in response to receiving individual positive edges 71 of a pulsed clock signal through input CP1. Data that is received by the registers 70a–70d during the enablement period is accepted (i.e., loaded) by these devices 70a–70d, for subsequent transfer to, for example, a microprocessor (not shown).

Memory devices 55a–55d are assumed to be memory chips, such as, for example, Dynamic Random Access Memory (DRAM) chips, and are each assumed to have a capability for being enabled for a predetermined time period, for accepting (i.e., loading) data received over buses 54a–54d, in response to receiving individual positive edges 59 of a pulsed clock As was previously described, in at least some conventional memory subsystems, such as the one represented in FIG. 8, there may be variations in the lengths of the buses 54a–54d coupling the devices 70 and 55a–55d. These variations may be a result of, for example, the use of memory devices 55a–55d and associated buses 54a–54d manufactured in accordance with different manufacturing tolerances/specifications. The variations in the lengths of the buses 54a–54d can cause data 53a–53d that is simultaneously transmitted from the registers 70a–70d of memory controller 70 during a write operation, to eventually arrive at the respective memory devices 55a–55d at different times, and at times that are not within a duration of a same enablement period of the respective memory devices 55a–55d. This can result in 'write' errors. A similar problem can also arise during 'read' operations where data is provided from the memory devices 55a–55d to the memory controller 70, resulting in 'read' errors.

For memory subsystems that include multiple memory modules (e.g., dual in-mode memory modules), wherein one or more memory devices 54a–55d are arranged on the memory modules, different ones of the memory modules may be manufactured in accordance with different manufacturing tolerances/criteria. As a consequence, there may be a great number of variations between the lengths of buses employed for coupling a memory controller to the different memory modules. As such, in these types of memory subsystems the above-described problems can be even more severe.

It is known to increase the speeds at which memory subsystems operate by employing techniques for reducing the overall amount of time required to successfully read and write data to individual memory chips, and by employing parallel memory chips. Extended-Data-Out (EDO) mode memory devices, Synchronous Dynamic Random Access Memory (SDRAM) devices, and Synchronous Dynamic Random Access Memory Double Data Rate (SDRAM-DDR) devices are examples of recent developments for increasing memory subsystem operating speeds. Memory subsystems that employ SDRAMs are synchronous (i.e., data is sent upon an occurrence of a positive edge of a clock signal pulse, and data is received upon an occurrence of a positive edge of a different clock signal pulse). In memory subsystems employing SDRAM-DDR devices, data can be sent upon an occurrence of a positive edge of a clock signal pulse, and received upon a negative edge of the same clock signal pulse. This capability allegedly reduces subsystem latency in half relative to the latency of subsystems that do not employ SDRAM-DDR devices. Memory subsystems that include SDRAM-DDR devices typically employ so called data strobes, which are sent along with data being transferred. Unfortunately, such data strobes require the use of extra pins and wiring, can increase system latency, and can cause an increase in the amount of time required for the memory subsystem to transition between 'read' and 'write' operations. In view of the foregoing considerations, it can be appreciated that it would be desirable to provide a technique which optimizes the performance of a memory subsystem by overcoming the above-described problems. It would also be desirable that the technique not require the use of extra signals or additional memory device circuitry, or require an increase in system latency, or an increase in the length of time needed to transition between 'read' and 'write' operations.

OBJECT OF THE INVENTION

It is an object of this invention to provide a technique which determines optimum temporal relationships of electrical (clock) signals employed for operating a memory control system of a computer system, for enabling the determined optimum temporal relationships to be subsequently used for operating the memory control system without error.

It is another object of this invention to provide a technique which compensates for differences in times at which portions of data transmitted from one component of a memory control system arrive at another, destination component of the memory control system, for enabling data transfer errors to be minimized.

SUMMARY OF THE INVENTION

The foregoing and other problems are overcome and the objects of the invention are realized by a method, and an apparatus that operates in accordance with the method, for initiating a start-up operation of a computer system having a memory control system. The memory control system includes a memory device and a memory controller which writes data to, and reads data from, the memory, as needed during the operation of the computer system. The method comprises steps of: A) exercising the memory device using the memory controller to determine a temporal range within which temporal relationships of electrical signals (e.g., clock signals) need to be set in order to operate the memory control system without error; B) setting the temporal relationships of the electrical signals so as to be within the determined temporal range; and C) storing a record of the determined temporal range, for subsequent use in operating the memory control system.

The method of the invention compensates for any differences in times at which portions of data being transferred from the memory controller to the memory device, and vice versa, arrive at the respective destination components, and minimizes the possibility of read/write errors being encountered. The method of the invention also enables the overall processing speed of the memory control system (and the computer system in general) to be increased, as the differences in the arrival times of the data are compensated for.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 shows a relationship between FIGS. 2a and 2b.

FIGS. 2a and 2b depict the memory subsystem of FIG. 1 in greater detail.

FIGS. 9 and 9b show portions of delay elements of the memory subsystem of FIG. 1a.

FIG. 9c shows flip-flops of registers of the memory subsystem of FIG. 1.

DETAILED DESCRIPTION OF THE INVENTION

Figure 1:
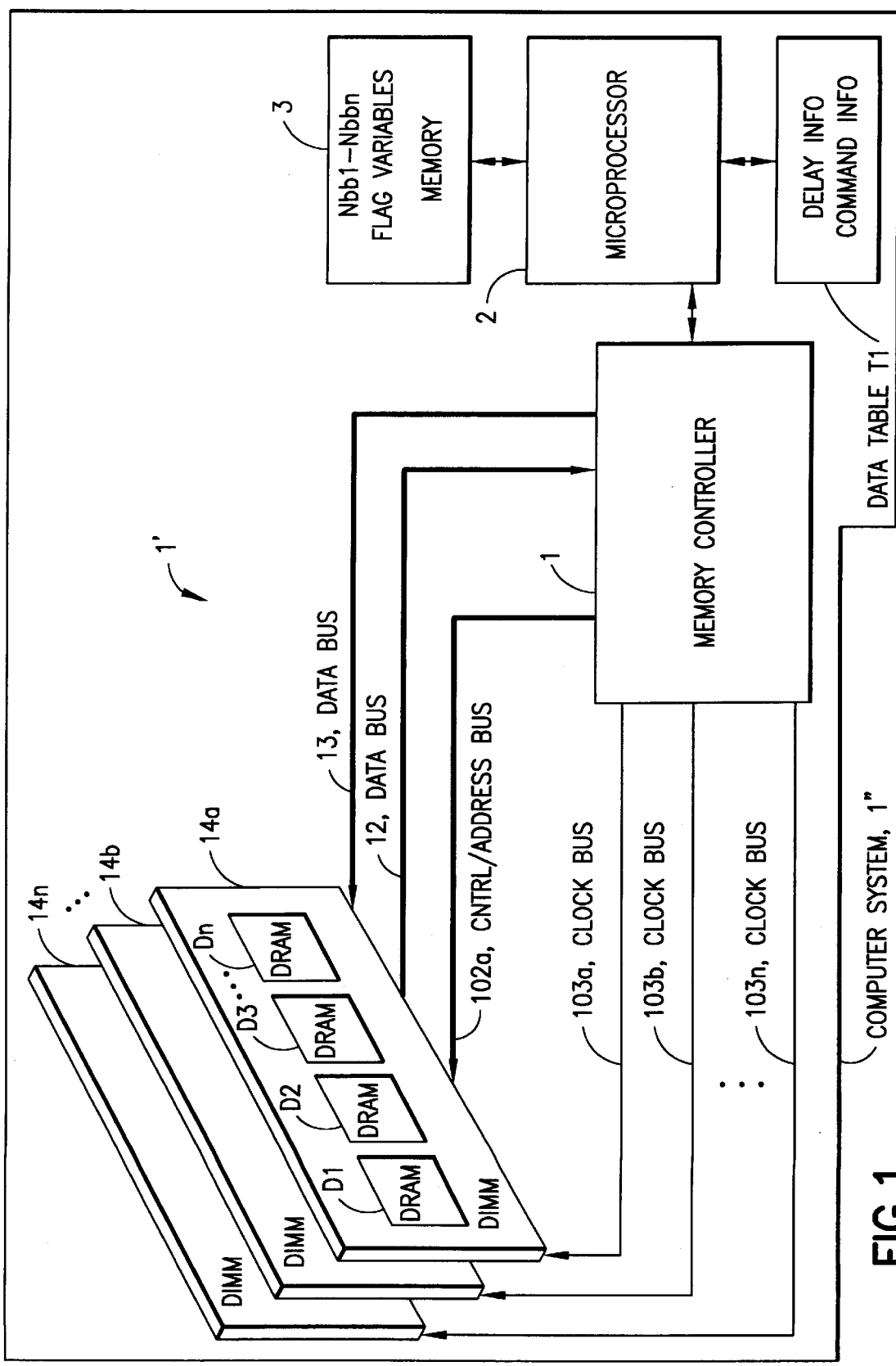
FIG. 1, depicts a memory subsystem of a computer system that is suitable for practicing this invention.

FIG. 1 depicts a memory subsystem 1' of a computer system 1" that is suitable for practicing this invention. The memory subsystem 1' comprises a microprocessor 2 that is bidirectionally coupled to a memory 3, a data table T1, and a memory controller 1, and also comprises various memory modules which, in a preferred embodiment of the invention, include dual in-line memory modules (DIMMs) 14a–14n. Preferably, each DIMM 14a–14n includes a plurality of memory devices, which in the preferred embodiment include Dynamic Random Access Memories (DRAMs) D1–Dn. The memory 3 is assumed to store an operating program for the microprocessor 2, flag variables (e.g., FLAG1, FLAG2, FLAG3, FLAG15a–FLAG15n, and FLAG16a1–FLAG16n3), information identified as (Nbb1)–(Nbbn) (hereinafter also referred to as "data Nbb1–Nbbn"), and other information that is received from the microprocessor 2 during the performance of a method in accordance with this invention. The flag variables and the information identified as (Nbb1)–(Nbbn) are employed in a manner as will be described below.

The data table T1 stores information specifying various values V1–V10, which are also referred to herein as predetermined phase delay values V1–V10, and corresponding command information. The information specifying the predetermined phase delay values V1–V10 and the corresponding command information is represented in FIG. 2c, and is employed in the method of the invention in a manner as will be described below.

The microprocessor 2 is assumed to control the operations of the computer system 1" in general, and is also assumed to control the memory controller 1 and the various DIMMs 14a–14n for writing (i.e., storing) data to, and for reading data from, the DRAMs D1–Dn of DIMMs 14a–14n, when required during the operation of the computer system 1". The microprocessor 2 also controls the timing of these operations, using clock signals. In other embodiments, the block 2 may represent a controller of the memory subsystem 1' that operates in accordance with instructions provided from a microprocessor of the computer system 1".

A control/address bus 102a, clock buses 103a–103n, and data buses 12 and 13, are also provided. The control/address bus 102a is preferably a multi-drop bus, and is employed for carrying control and address information from the memory controller 1 to the DRAMs D1–Dn of the DIMMs 14a–14n during write and read operations. Clock buses 103a–103n are employed for providing clock signals to the DRAMs D1–Dn of the respective DIMMs 14a–14n.

Data buses 12 and 13 are also preferably multi-drop buses, and are employed for carrying data being exchanged between the memory controller 1 and memory locations within DRAMs D1–Dn of the DIMMs 14a–14n, during read and write operations. It should be noted that each of the buses 102a, 12, and 13 may be a single bus that is coupled to the DRAMs D1–Dn of each DIMM 14a–14n or may include a plurality of respective buses that are coupled to DRAMs D1–Dn of respective ones of the DIMMs 14a–14n. Also, it should be noted that in other embodiments of the invention, there may be more than a single clock bus 103a–103n provided between the memory controller 1 and each respective DIMM 14a–14n, if more than a single clock signal is provided to each DIMM 14a–14n. For simplicity, only a single clock bus 103a–103n is shown as being coupled to each individual DIMM 14a–14n. Preferably, the buses which are coupled to single ones of the DIMMs 14a–14n have similar load-carrying capabilities.

Figure 2B:
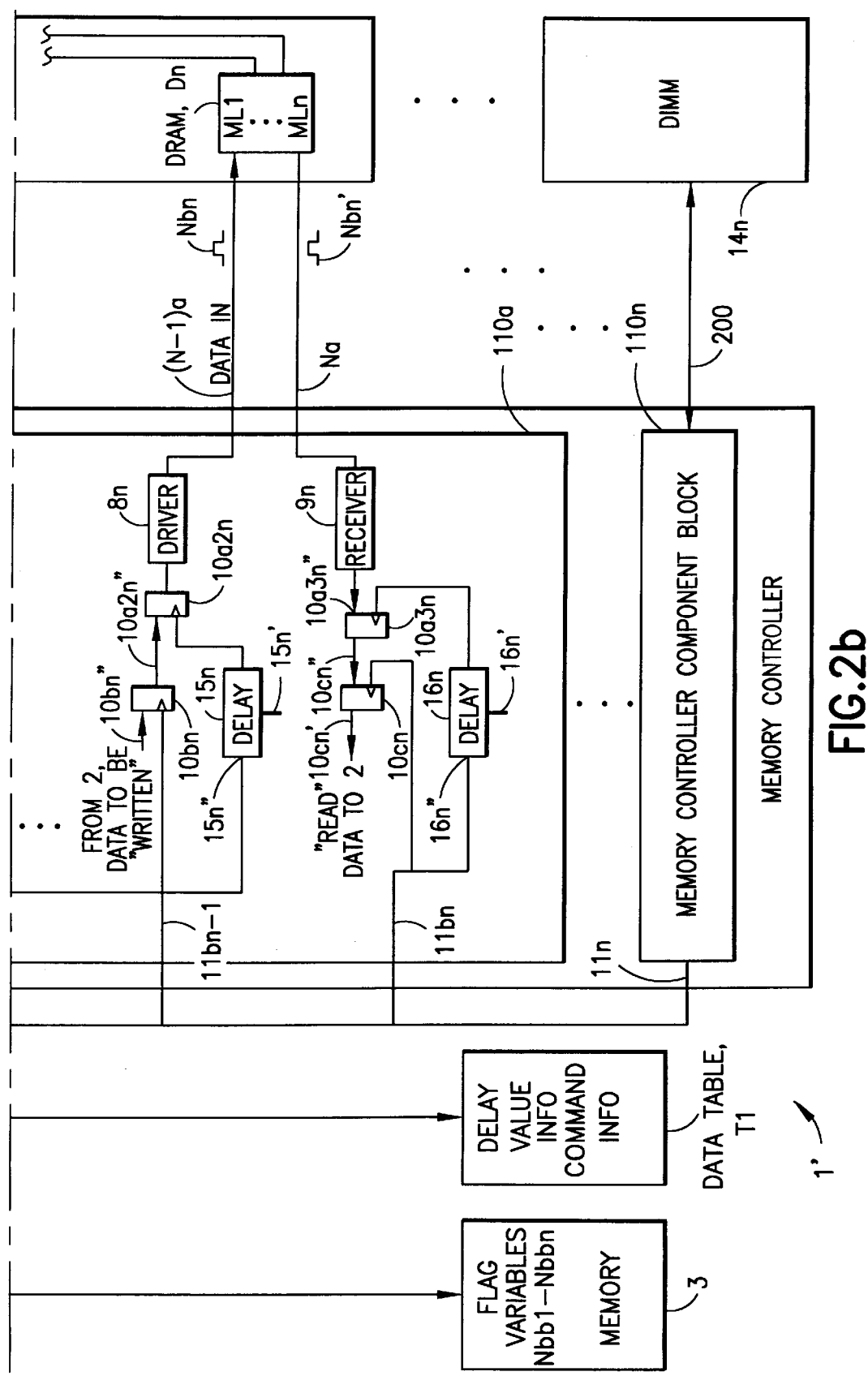
Figure 2C:
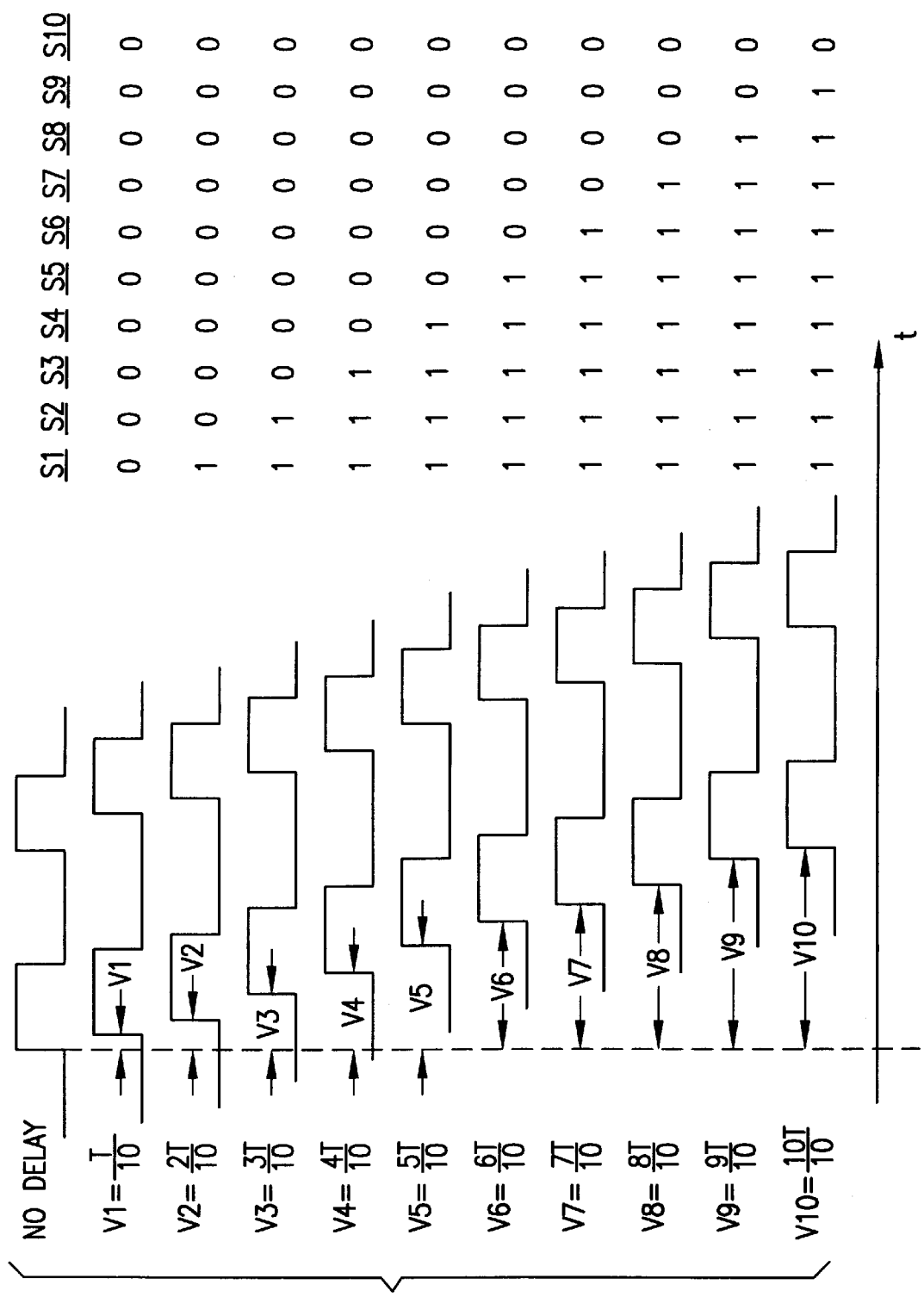
FIG. 2c depicts various clock signals employed in the memory subsystem of FIG. 1, after having been temporally displaced by delay elements of the memory subsystem, and further depicts information provided to the delay elements for placing the delay elements in settings corresponding to the temporal displacements.

Reference is now made to FIGS. 2a and 2b which depict the memory subsystem 1' in further detail. For convenience, only two DIMMs 14a and 14n, and only the DRAMs D1 and Dn of DIMM 14a, are shown in FIGS. 2a and 2b, although it is assumed for the purposes of this description that the subsystem 1' includes DIMMs 14a–14n, and that each DIMM 14a–14n includes one or more DRAMs D1–Dn. It should be noted that any suitable number of DIMMs 14a–14n, and any suitable number of DRAMs D1–Dn per DIMM 14a–14n, may be employed in the memory subsystem 1', depending on applicable computer system performance criteria. Also, memory locations within each DRAM D1–Dn are hereinafter referred to as memory locations ML1–MLn.

In accordance with a preferred embodiment of the invention, the memory controller 1 includes memory controller component blocks (also referred to as circuit blocks) 110a–110n, which correspond to the DIMMs 14a–14n, respectively. According to a preferred embodiment of the invention, each of the memory controller component blocks 110a–110n comprises registers 10a1, 10a2a–10a2n, 10a3a–10a3n, 10b1–10bn, and 10c1–10cn, delay elements 11a, 15a–15n, and 16a–16n, buses 11b1–11bn, drivers 8a–8n, and receivers 9a–9n. These various components are interconnected within each block 110a–110n in the manner shown in FIGS. 2a and 2b. The delay elements 11a, 15a–15n, and 16a–16n have respective inputs 11a', 15a'–15n', and 16a'–16n', which are each assumed to be coupled to an output (not shown) of the microprocessor 2, although this is not shown in FIGS. 2a and 2b in order to simplify the depiction of the subsystem 1'. Similarly, the registers 10b1–10bn have respective inputs 10b1"–10bn" that are each assumed to be coupled to an output of the microprocessor 2, and the registers 10c1–10cn have respective outputs 10c1'–10cn' that are each assumed to be coupled to an input (not shown) of the microprocessor 2, although this is also not shown in FIGS. 2a and 2b in order to simplify the depiction of the subsystem 1'. It should further be noted that for convenience, only the various components of memory controller component block 110a are shown in FIGS. 2a and 2b.

FIG. 2b also shows buses (N–1)a and (N)a which couple the DRAM Dn of DIMM 14n to driver and receiver components 8n and 9n, respectively, of the memory controller 1. The memory controller 1 writes data to, and receives data from, the DRAM DN through these respective buses (N–1)a and (N)a. FIG. 2b further shows a bus 11n, which couples bus 11 to memory controller component block 110n, and which is assumed to singularly represent a plurality of buses similar to buses 11b1–11bn. In addition, FIG. 2b shows the DIMM 14n, and an interface 200 which couples the DIMM 14n to the memory controller 1. The interface is assumed to represent various buses required for coupling the DRAMs (not shown) of the DIMM 14n to memory controller component block 110n.

According to a preferred embodiment of the invention, each register 10a1, 10a2a–10a2n, 10a3a–10a3n, 10b1–10bn, and 10c1–10cn is "enabled" for a predetermined time period (also referred to as an "enablement period") in response to receiving a positive edge of a clock pulse, for accepting (i.e., loading) data received at a respective input 10a1", 10a2a'–10a2n", 10a3a"–10a3n", 10b1"–10bn", and 10c1"–10cn" of the register, for subsequent transfer to an output of the register. According to a preferred embodiment of the invention, each register 10a1, 10a2a–10a2n, 10a3a–10a3n, 10b1–10 bn, and 10c1–10cn is a 4-bit register and includes flip-flips FF1–FF4, which are depicted in FIG. 9c. In FIG. 9c, inputs 100a–100d and outputs 101a–101d are shown. The inputs 100a–100d are assumed to collectively represent to individual ones of the data inputs 10a1", 10a2a"–10a2n", 10a3a"–10a3n", 10b1"–10bn", and 10c1"–10cn", of the respective registers 10a1, 10a2a–10a2n, 10a3a–10a3n, 10b–10bn, and 10c1–10cn, and the outputs 101a–101d shown in FIG. 9c are assumed to collectively represent individual data outputs of these registers. Also, a clock signal input (CP) of FIG. 9c is assumed to correspond to an individual clock pulse input of the individual registers 10a1, 10a2a–10a2n, 10a3a–10a3n, 10b1–10bn, and 10c1–10cn. Preferably, the flip-flops FF1–FF4 are positive-edge-triggered flip-flops such as, for example, D-type positive-edge-triggered flip-flops, although in other embodiments positive-edge-triggered master-slave flip-flops may also be employed. Each flip-flop FF1–FF4 is preferably responsive to a positive edge of a clock signal being applied to input (CP) for being enabled for a predetermined time period (referred to hereinafter as an "enablement period"), during which time period bits of data received at the inputs 100a–100d of the respective flip-flops FF1–FF4 are accepted (i.e., loaded), for subsequent transfer to a respective output 101a–101d.

As was previously described, the microprocessor 2 controls the timing of operations performed by the memory controller 1 and DIMMs 14a–14n, using clock signals. To this end, the microprocessor 2 includes a local clock signal generator 2' that generates a pulsed local clock signal 11'. The generated local clock signal 11' is output from the microprocessor 2 to each memory controller component block 110a–110n through the bus 11 and the buses 11b1–11bn. Within each memory controller component block 110a–110n, the local clock signal 11' is provided to registers 10b1–10bn and 10c1–10cn, and to respective inputs 11a, 15a–15n", and 16a"–16n" of the respective delay elements 11a, 15a–15n, and 16a–16n. Also, the local clock signal 11' is provided to the registers 10a1, 10a2a–10a2n, and 10a3a–10a3n through the delay elements 11a, 15a–15n, and 16a–16n, as can be appreciated in view of FIGS. 2a and 2b. The local clock signal 11' is also provided to each DRAM D1–Dn of DIMM 14a through the delay element 11a, driver 8b, and bus 103a.

The microprocessor 2 has a capability for varying the amount of temporal displacement (hereinafter also referred to as "phase delay") provided by each individual delay element 11a, 15a–15n, and 16a–16n to the local clock signal 11' applied to the delay element (i.e., each delay element is programmable by the microprocessor 2). To this end the delay elements 11a, 15a–15n, and 16a–16n have the respective inputs 11a', 15a'–15n', and 16a'–16n', which, as was previously described, are each coupled to an output (not shown) of the microprocessor 2. Each delay element 11a, 15a–15n, and 16a–16n preferably has multiple delay "settings", individual ones of which may be selected by the microprocessor 2 during the operation of the method of the invention. In a preferred embodiment, and assuming that local clock signal 11' has a period of (T), each delay element 11a, 15a–15n, and 16a–16n has a capability for temporally displacing the signal by a temporal displacement that is at least as small as ($\frac{1}{10}$)(T). This displacement is hereinafter referred to as a "predetermined phase delay amount", and is represented by "V1" in FIG. 2c. Reference is now made to FIG. 9a which shows a delay element 84 that is constructed in accordance with a preferred embodiment of the invention. The delay element 84 comprises a plurality of delay portions 80a–80j, each of which includes first and second multiplexers M21a and M21b, respectively. The first and second multiplexers M21a and M21b are preferably 2-to-1 line multiplexers. The first and second multiplexers M21a and M21b of the respective delay portions 80a–80j are connected together in the manner shown in FIG. 9a. The first multiplexer M21a of the respective delay portions 80a–80j have respective inputs S1–S10 that are assumed to be connected to an output of the microprocessor 2, and the second multiplexer M21b of the respective delay portions 80a–80j have respective inputs 81a–81j that are assumed to be coupled to, for example, a binary '0' provided from microprocessor 2. In the preferred embodiment of the invention, each of the delay elements 11a, 15a–15n, and 16a–16n of FIGS. 2a and 2b is similar to the delay element 84 of FIG. 9a, and each input 11a', 15a'–15n', and 16a'–16n' of the respective delay elements 11a, 15a–15n, and 16a–16n is assumed to singularly represent the collective inputs S1–S10 of delay element 84. Throughout this description, reference labels S1–S10 are used interchangeably with individual ones of the reference labels 11a', 15a'–15n', and 16a'–16n', for identifying delay element control inputs. Also, inputs 11a", 15a"–15n", and 16a"–16n" of respective delay elements 11a, 15a–15n, and 16a–16n are each assumed to correspond to input 82 of FIG. 9a, and outputs of the respective delay elements 11a, 15a–15n, and 16a–16n are each assumed to correspond to output 83 of FIG. 9a.

In a preferred embodiment, in addition to the delay portions 80a–80j, the delay elements 11a and 16a–16n also include an inverter 85 and another multiplexer M21c, both of which are connected together in the manner shown in FIG. 9b. For these delay elements 11a and 16a–16n, an input 86 (FIG. 9b) is assumed to be coupled to output 83 of the delay portion 80a of FIG. 9a, and the multiplexer M21c has an output 87 that is assumed to represent the individual outputs of the respective delay elements 11a and 16a–16n. Between the input 86 and an input (I0) of the multiplexer M21c is coupled the inverter 85. Input 86 is also coupled to an input (I1) of the multiplexer M21c. Furthermore, the multiplexer M21c includes an input 88 that is assumed to be coupled to the microprocessor 2.

As was previously described, each delay element 11a, 15a–15n, and 16a–16n preferably has multiple delay "settings", individual ones of which may be selected by the microprocessor 2 using information applied to the inputs 11a', 15a'–15n', and 16a'–16n' (i.e., inputs S1–S10) of the delay elements. The amount of temporal displacement (hereinafter referred to as "phase delay") (V1–V10) imparted by the individual delay elements 11a, 15a–15n, and 16a–16n to received signals, for each of these delay settings, and an example of information provided by the microprocessor 2 to the inputs S1–S10 of the individual delay elements, for causing these delay elements to be placed in the respective delay settings, is represented in FIG. 2c.

The microprocessor 2 also has a capability for controlling whether or not particular ones of the delay elements 11a and 16a–16n invert signals that are applied to the input 86, for providing either non-inverted or inverted versions of the signals through output 87. By example, for selecting a non-inverted version of a signal applied to input 86, the microprocessor 2 applies a binary '1' to input 88 of multiplexer M21c. For selecting an inverted version of the signal, the microprocessor 2 applies binary '0' to input 88 of multiplexer M21c, as can be appreciated in view of FIG. 9b.

The microprocessor 2 also has a capability for operating in conjunction with the memory controller 1 for selecting a memory location ML1–MLn of a DRAM D1–Dn from a particular DIMM 14a–14n, for writing data to, and for subsequently reading data from, this memory location, as needed during the operation of computer system 1". For example, it is assumed that, during the operation of the computer system 1", it is required that data be written from the microprocessor 2 to a particular one of the memory locations ML1 of DRAM D1 from DIMM 14a. In this case, the microprocessor 2 provides data 10' to an input of register 10a1, through a bus 10. The data 10' includes an address of the memory location ML1, and a command indicating that data is to be written to this memory location ML1. After register 10a1 receives this data 10', and in response to the register 10a1 also receiving a positive edge of the local clock signal 11' through input 10a1', the register 10a1 outputs the data 10' to the driver 8a, which then responds by buffering the data 10' for driving the data 10' from the memory controller 1, through the bus 102a, and to the DRAMs D1–Dn of the DIMM 14a. After the data 10' is received by DRAM D1, the DRAM D1 is assumed to recognize that further data is to be written to memory location ML1 of DRAM D1, based on the command and address information included in the received data 10'.

Thereafter, the microprocessor 2 provides other data (i.e., data that is to be written to the DRAM D1) to register 10b1 through input 10b1". Then, after each of the registers 10b1 and 10a2a receives respective positive edges of the local clock signal 11', the data is forwarded through the registers 10b1 and 10a2a to the driver 8c, which then buffers the data for driving the signal from the memory controller 1, through the bus 104a, and to the DRAM D1 for subsequent storage therein in the memory location ML1. Each DRAM D1–Dn is assumed to have a capability for loading (also referred to as accepting) data received through a respective one of the buses 104a–(N-1), for subsequent storage therein, in response to receiving positive edges of local clock signal 11' through bus 103a (the number of positive edges depends on the number of bits employed). As such, assuming that the data is received by the DRAM D1, and that the DRAM D1 also receives a positive edge of the local clock signal 11' through bus 103a, then the DRAM D1 responds by loading the data into the DRAM D1. In this manner, a 'write' procedure is performed, wherein the microprocessor 2 operates in conjunction with the memory controller 1 so as to write data to memory location ML1 within DRAM D1.

As was previously described, the microprocessor 2 also operates in conjunction with the memory controller 1 for reading data from selected memory locations ML1–MLn of selected ones of the DRAMs D1–Dn. As an example, it is assumed that data was already written to the memory location ML1 of DRAM D1, in the manner described above, and that the microprocessor 2 subsequently recognizes that a computer system operation requires that the data be read back to the microprocessor 2 from this memory location ML1. To read back the data, the microprocessor 2 again provides data 10' to the DRAMs D1–Dn via the register 10a1, driver 8a, and bus 102a, in the manner described above. However, in this case the data 10' includes a command specifying that the DRAM D1 provide the data stored in memory location ML1 back to the memory controller 1.

After the DRAM D1 receives this command, the DRAM D1 retrieves the stored data, and then, in response to receiving a next positive edge of the local clock signal 11' through bus 103a, the DRAM D1 forwards the retrieved data through the bus 105a and receiver 9a to register 10a3a. After register 10a3a receives the data and a positive edge of local clock signal 11', the data is loaded into (i.e., accepted by) the register. The data is subsequently forwarded from the register 10a3a to the microprocessor 2 via register 10c1. In this manner, a 'read' operation is performed, wherein data stored in DRAM D1 is read back from the DRAM D1 by the microprocessor 2 operating in conjunction with the memory controller 1.

Before describing the method of the invention, a brief reference will first be made to some of the problems that are overcome by the invention. As was previously described, in at least some memory subsystems, there may be variations between the lengths of the buses 102a, 103a, 104a–(n-1)a, and 105a–((N)a) employed for coupling a memory controller to memory devices. These differences may be a result of, for example, the use of different types of memory devices and associated buses manufactured by different manufacturers. The variations in the bus lengths can cause data that is transferred through different ones of the buses to arrive at destination components at different times, and may ultimately result in portions of the data not being simultaneously loaded into the destination components. As a consequence, read and/or write errors may arise. Also, the variations in the bus lengths may have an affect of limiting the overall processing speed of the computer system, since a component may need to wait to receive data being forwarded to the component over a longest one of the buses, before performing a particular operation, and/or a microprocessor of the computer system may need to wait for a time interval until the read and/or write operations are completed successfully for all memory devices of the computer system before executing a next instruction.

In view of these considerations, the inventors have developed a novel technique which optimizes the performance of a memory subsystem of a computer system, and which overcomes the problems described above.

As was previously described, the memory 3 stores an operating program for controlling the operations of the microprocessor 2, and for controlling the operations of the memory subsystem 1' in general. In accordance with this invention, the operating program includes routines for implementing the method of the invention, which is described below in relation to FIGS. 3a–3f.

Figure 3A:
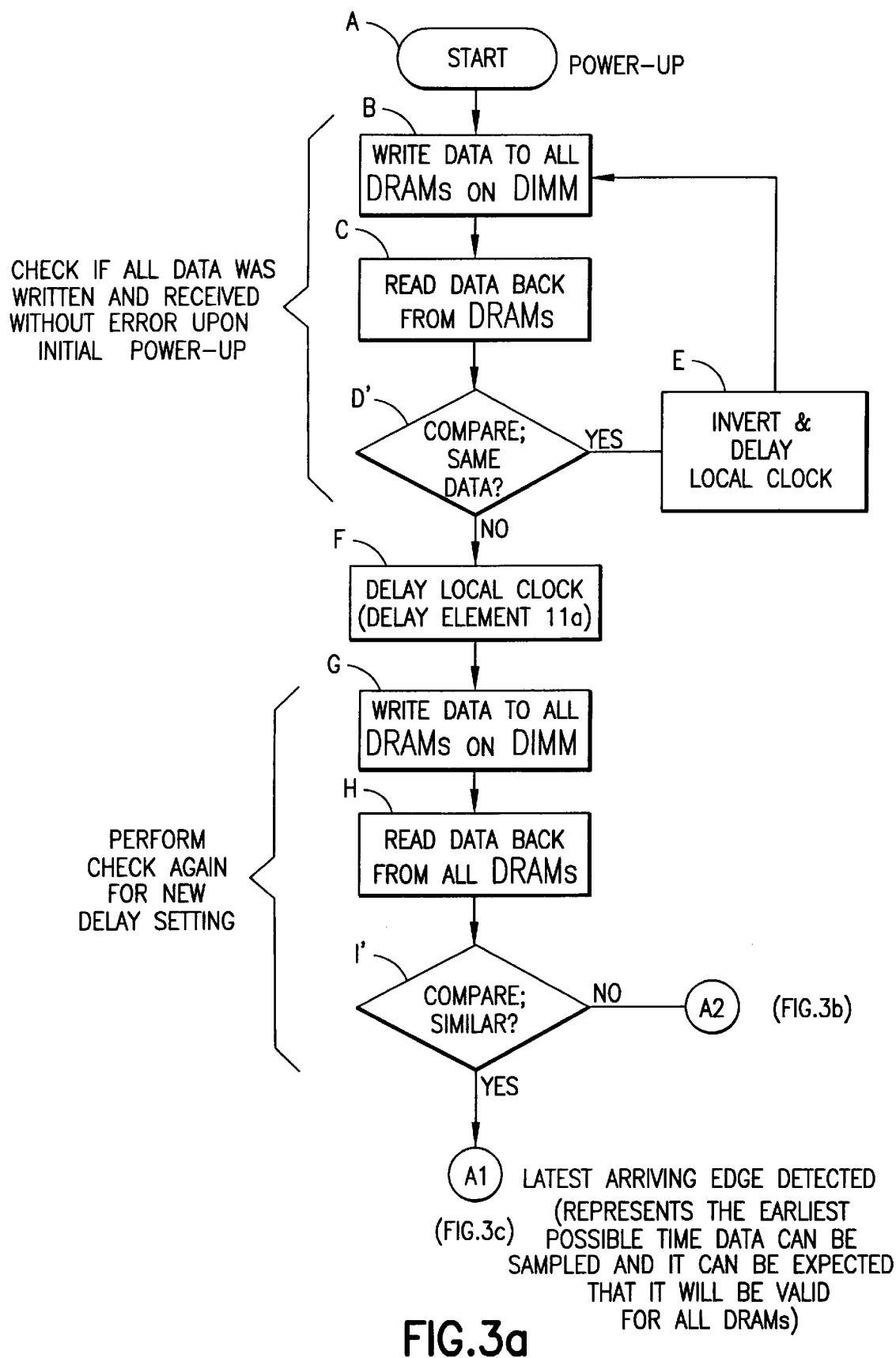
FIGS. 3a–3f are logical flow diagrams depicting a method in accordance with this invention.

Reference is now made to FIG. 3a which illustrates a first portion of the method of the invention. At block A the method is started. It is assumed at block A that the computer system 1" is powered-on, and that this is recognized by the microprocessor 2. It is also assumed that the delay elements 11a, 15a–15n, and 16a–16n are initially programmed so as to provide the delay amount represented by V1 in FIG. 2c, and that the local clock signal generator 2' begins to continuously generate the local clock signal 11'.

At block B it is assumed that the microprocessor 2 controls the memory controller 1 in the manner described above so as to write data to a particular memory location ML1–MLn of each DRAM D1–Dn of a particular one of the DIMMS 14a–14n. Which one of the DIMMs 14a–14n, and which one of the memory locations ML1–MLn of the DRAMs D1–Dn within this DIMM, the microprocessor 2 writes data to at block B is not considered to be germane to this invention, and may be determined in accordance with applicable system operating performance criteria. For example, at block B the data may be written to any selected one of the memory locations ML1–MLn of the DRAMs D1–Dn of any selected one of the DIMMs 14a–14n coupled to the memory controller 1. For the purposes of this description, it is assumed that at block B the microprocessor 2 writes data to memory location ML1 of each DRAM D1–Dn of DIMM 14a, in the above-described manner.

In a preferred embodiment of the invention, the data written to each DRAM D1–Dn at block B includes predetermined information, such as a data nibble that includes a unique, predetermined bit pattern (also hereinafter referred to as a timing pattern). The predetermined bit pattern is preferably complex enough to include data dependent jitter (i.e., a wide bandwidth of frequencies), and is preferably one that is not likely to be randomly received by the memory controller 1 from the DIMMs 14a–14n during the operation of the memory subsystem 1'. For the purposes of this description, the data written to the respective DRAMs D1–Dn at block B is hereinafter referred to as data (Nb1)–(Nbn), respectively, and it is assumed that the data (Nb1)–(Nbn) is similar to the respective data (Nbb1)–(Nbbn) stored in memory 3.

At block C the microprocessor 2 operates in conjunction with the memory controller 1 in the above-described manner so as to attempt to retrieve (i.e., 'read') data from the memory location ML1 of the respective DRAMs D1–Dn of DIMM 14a. This 'reading' step is assumed to result in data being provided by the DRAMs D1–Dn to the microprocessor 2. For the purposes of this description, data that is provided to the microprocessor 2 from the respective DRAMs D1–Dn during a 'read' operation is hereinafter referred to as data (Nb1')–(Nbn'), respectively. For cases in which the data (Nb1)–(Nbn) was previously written successfully (without error) to the respective DRAMs D1–Dn, and was then successfully read back from these DRAMs D1–Dn to the microprocessor 2, the data (Nb1')–(Nbn') is assumed to be similar (i.e., includes a same bit pattern) to the respective, "written" data (Nb1)–(Nbn), and to the respective data (Nbb1)–(Nbbn) from memory 3.

Figure 4A:
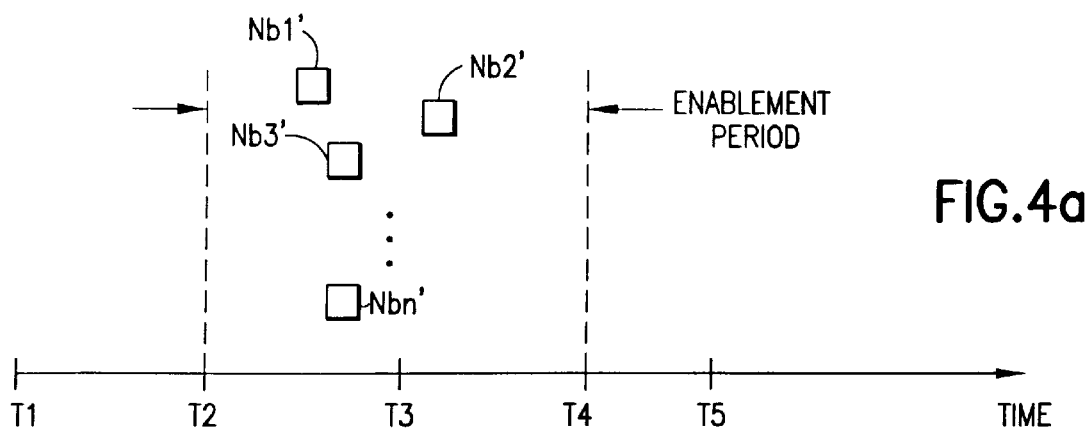
FIGS. 4a and 4b depict an exemplary relationship between times at which enablement periods for registers of the memory subsystem of FIG. 1 occur, relative to times at which data is received by these registers.

After the data (Nb1')–(Nbn') is read by the microprocessor 2 at block B, the microprocessor 2 compares the data (Nb1')–(Nbn') to the data (Nbb1)–(Nbbn) stored in the memory 3 to determine whether or not the retrieved data (Nb1')–(Nbn') is similar to the respective data (Nbb1)–(Nbbn) (block D'). A determination of 'yes' at block D' is assumed to indicate that data was correctly written to, and subsequently correctly read from, the DRAMs D1–Dn at the respective blocks B and C. As an example of a correct or successful 'read' operation, it is assumed that the performance of the step of block B resulted in the data (Nb1)–(Nbn) being correctly written to the memory location ML1 of the DRAMs D1–Dn, and that at block C the microprocessor 2 commands the DRAMs D1–Dn to provide the data from memory location ML1 of the DRAMs D1–Dn to the memory controller 1 in the above-described manner. It is also assumed that the DRAMs D1–Dn respond to receiving the commands by forwarding respective data (Nb1')–(Nbn') to the respective registers 10a3a–10a3n, and that the data (Nb1')–(Nbn') is received at the respective registers 10a3a–10a3n at times which enable the data to be loaded into these registers 10a3a–10a3n within an enablement period (occurring between times T2 and T4) of the registers 10a3a–10a3n (even though different portions of data (Nb1')–(Nbn') may arrive at the registers at different times due to, e.g., variations in lengths of the buses 105a–(Na)), as is represented in FIG. 4a. As can be appreciated, in this case, the successful loading of the data (Nb1')–(Nbn') into the registers 10a3a–10a3n within the enablement period of these registers enables the data to be successfully forwarded to the microprocessor 2 through respective registers 10c1–10cn.

If 'yes' at block D', then control passes to block E where the microprocessor 2 controls the delay element 11a in the manner described above so as to cause the amount of delay provided by the delay element 11a to be incremented by the predetermined phase delay amount, thereby causing the local clock signal 11' applied to delay element 11a to be phase delayed accordingly. Also at block E, the microprocessor 2 controls the delay element 11a in the manner described above so as to invert the phase delayed local clock signal 11', and, as a result, the local clock signal 11' provided to the DRAMs D1–Dn is phase delayed and inverted accordingly. By example, the microprocessor 2 controls the delay element 11a at block E by providing binary information, such as '100000000', to the delay element 11a through delay element input 11a', for causing the delay element 11a to phase delay local clock signal 11' by delay amount V2 (see, e.g., FIG. 2c), and causes the phase delayed signal to be inverted by providing a binary '0' to input 88 of multiplexer 88.

Figure 4B:
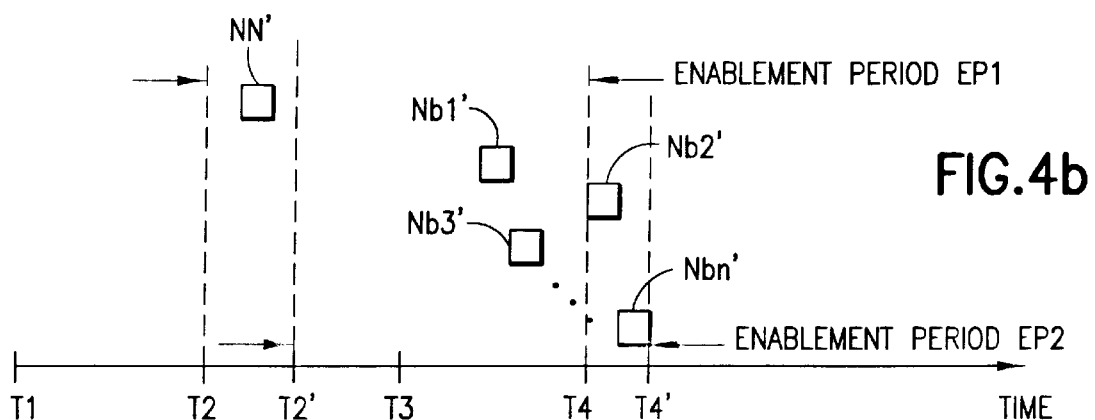

Thereafter, control passes back to block B, where the data (Nb1)–(Nbn) is again written to one of the memory locations ML1–MLn of the respective DRAMs D1–Dn of DIMM 14a, in the manner described above, and the steps identified by blocks C and D' are again performed in the above-described manner until it is determined at block D' that data (Nb1')–(Nbn') read back from at least one of the DRAMs D1–Dn of DIMM 14a differs from the respective stored data (Nbb1)–(Nbbn) ('no' at block D'). It should be understood that in a case wherein data (Nb1')–(Nbn') read from a DRAM D1–Dn is determined to differ from the respective data (Nbb1)–(Nbbn) (and the respective stored data (Nbb1)–(Nbbn)) at block D', the technique of the invention assumes that an error must have occurred during the read operation of block C. By example, owing to the performance of the step of block E and, e.g., variations in the lengths of the buses 105a–((N)a) through which the data (Nb1')–(Nbn') travels, not all of the data (Nb1')–(Nbn') may arrive at the registers 10a3a–10a3n at times which enable the complete data (Nb1')–(Nbn') to be accepted by the registers 10a3a–10a3n during a same enablement period (EP1) (occurring between times T2–T4) of the registers 10a3a–10a3n. As a result, and some other, incorrect data NN' received by the registers 10a3a–10a3n may be accepted during this enablement period (EP1) instead, as is represented in FIG. 4b. It should be further noted that the steps of blocks B, C, D', and E are performed to deliberately cause the phase of the local clock signal 11' output from the delay element 11a to be such that an error occurs during the performance of step D'. This enables a subsequent determination to be made of a first setting of delay element 11a which causes data to be transferred between devices 1 and D1–Dn without error, as will be described below.

After it is determined at block D' that the data (Nb1')–(Nbn') read back from one or more of the DRAMs D1–Dn differs from respective data (Nbb1)–(Nbbn) stored in memory 3 ('no' at block D'), control passes to block F where the microprocessor 2 again controls the delay element 11a through input 11a' so as to cause the delay element 11a to be placed in a next delay setting. By example, the microprocessor 2 controls the delay element 11a at block E by providing binary information, such as '1100000000', to the delay element 11a through delay element input 11a', for causing the delay element 11a to phase delay the local clock signal 11' by a total phase delay amount V3 (see, e.g., FIG. 2c).

Thereafter, control passes to block G where data (Nb1)–(Nbn) (corresponding to the data (Nbb1)–(Nbbn) from memory 3) is again written to one of the memory locations ML1–MLn of the respective DRAMs D1–Dn of DIMM 14a, in a similar manner as was described above. Then, at block H the microprocessor 2 operates in conjunction with the memory controller 1 in the above-described manner to read data from this memory location of the DRAMs D1–Dn. Assuming that this step results in data (Nb1')–(Nbn') being retrieved from the DRAMs D1–Dn, then at block I' the microprocessor 2 compares the retrieved data (Nb1')–(Nbn') to the data (Nbb1)–(Nbbn) stored in the memory 3 to determine whether or not the data (Nb1')–(Nbn') is similar to the respective data (Nbb1)–(Nbbn). If 'yes' at block I', indicating that the data (Nb1')–(Nbn') was successfully accepted by the respective registers 10a3a–10a3n during a single enablement period of respective registers 10a3a–10a3n (i.e., no error occurred during the 'read' operation performed at block H), then control passes through connector A1 to block N' of FIG. 3c, where a further step is performed in a manner which will be described below.

Figure 3B:
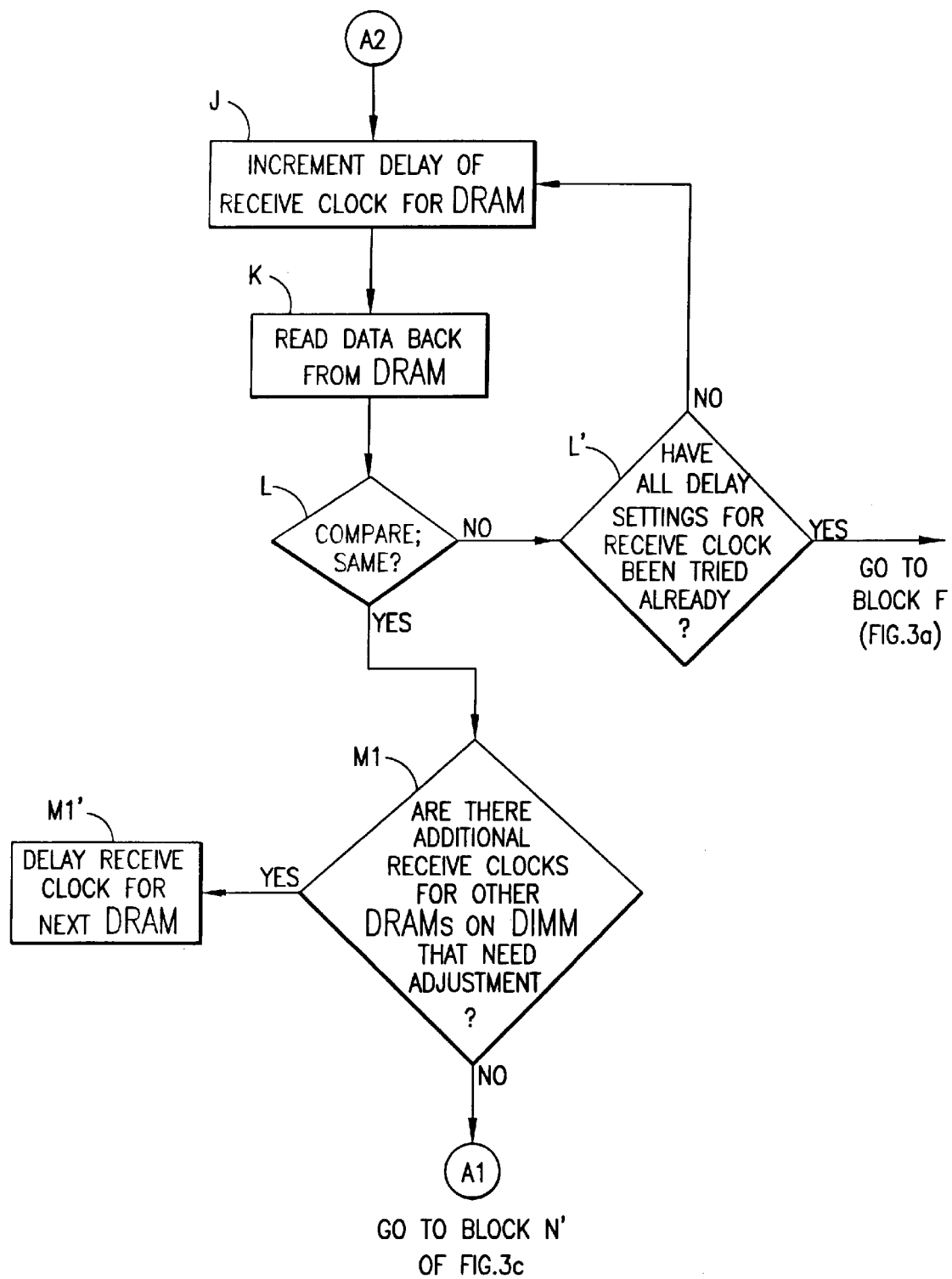

If 'no' at block I', indicating that an error occurred during the 'read' operation performed at block H, then control passes through connector A2 to block J of FIG. 3b, where the microprocessor 2 controls one the delay elements 16a–16n so as to cause the amount of delay provided by this delay element to be incremented by the predetermined phase delay amount (i.e., so as to increment the delay setting of this delay element). For the purposes of this description, it is assumed that the delay element controlled by the microprocessor 2 at block J is delay element 16a. By example, the microprocessor 2 may control delay element 16a at block J by providing binary information, such as '1000000000', to this delay element 16a through delay element input 16a', for causing the delay element 16a to phase delay local clock signal 11' applied to the register 10a3a by delay amount V2.

Thereafter, at block K the microprocessor 2 operates in conjunction with the memory controller 1 in the above-described manner so as to read data from a memory location, such as memory location ML1, of the DRAM D1. This step is assumed to result in data (Nb1') being provided by the DRAM D1 to the microprocessor 2 through the bus 105a, receiver 9a, and registers 10a3a (including flip-flops FF1–FFn) and 10c1.

After the step of block K is performed, and the microprocessor 2 receives the data (Nb1') from the register 10c1, the microprocessor 2 compares the received data (Nb1') to the data (Nbb1) stored in the memory 3 to determine whether or not the compared data is similar. If 'no' at block L, then control passes to block L' where the microprocessor 2 determines whether or not the delay element 16a has been incremented through each of its delay settings. This determination may be made in accordance with any suitable technique. By example, each time the microprocessor 2 increments the delay setting of the delay element 16a at block J, the microprocessor 2 may increase a value of a counter variable (not shown). In this case, the performance of block L' may include steps of the microprocessor 2 comparing a present value of the counter variable to a predetermined value, such as '10', which indicates the total number of delay settings for the delay element 16a. If the value of the counter variable is less than the predetermined value, then the step of block L' results in a determination of 'no'. Otherwise, the step of block L' results in a determination of 'yes'.

A case wherein a determination of 'yes' is made at block L' will now be described. If 'yes' at block L', indicating that data (Nb1') has been read from the DRAM D1 for each delay setting of the delay element 16a, then control passes back to block F (FIG. 3a) where the microprocessor 2 controls the delay element 11a so as to place the delay element 11a in a next delay setting, and the method then proceeds in the manner described above.

If the performance of the step of block L' results in a determination of 'no', then control passes back to block J where the microprocessor 2 again controls the delay element 16a so as to place the delay element 16a in its next delay setting. By example, and assuming that the delay element 16a was previously placed in the delay setting corresponding to phase delay amount V2 represented in FIG. 2c, then at block J the microprocessor 2 controls the delay element 16a so as to place the delay element 16a in the delay setting corresponding to phase delay amount V3 represented in FIG. 2c. Thereafter, the steps of blocks K and L are performed in a similar manner as was previously described. Also, as long as the performance of the steps of block L and L' result in a determination of 'no', then the steps of block J and K are continuously performed in a similar manner as was described above.

Figure 4C:
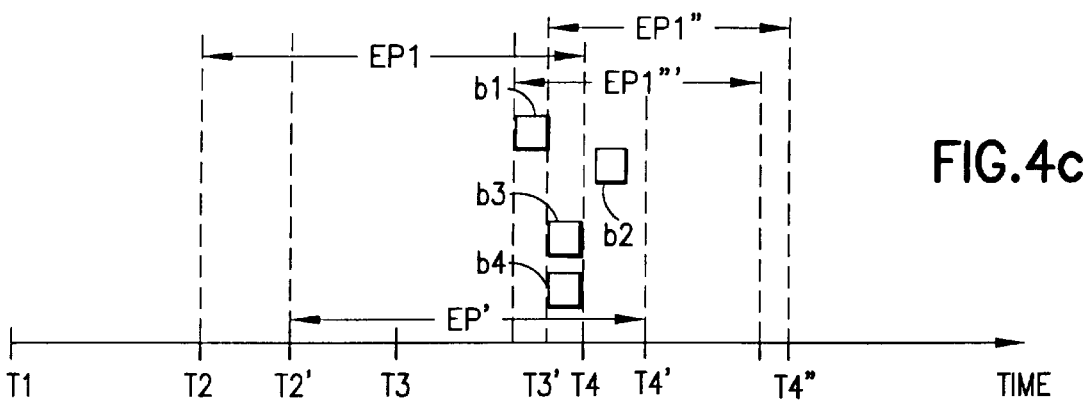
FIGS. 4c and 4d depict an exemplary relationship between times at which enablement periods for registers and memory devices of the memory subsystem of FIG. 1 occur, relative to times at which bits of data are received by these registers and memory devices.

As can be appreciated, each time the delay element 16a is placed in a next delay setting at block J, for delaying the local clock signal 11' applied to the register 10a3a, the time at which the register 10a3a, and hence, the time at which the flip-flops FF1–FF4 of the register 10a3a, are triggered is delayed accordingly, until it is eventually determined at block L that data (Nb1') read at block K is similar to the data (Nbb1) stored in the memory 3 ('yes' at block L). This indicates that the read operation of block K was performed successfully. By example, FIG. 4c shows an example of how the time at which the individual flip-flops FF1–FFn are triggered is delayed from time T2 to a time T2', owing to the performance of the steps of blocks J, K, L, and L'. In this example, it is assumed that the triggering of the flip-flops FF1–FFn at time T2' results in bits b1–b4 of the data (Nb1') being loaded within a single enablement period EP1 of the flip-flops F1–F4, even though not all of the bits may arrive at the flip-flops F1–F4 simultaneously. As a result, the data (Nb1') is able to be correctly read from the DRAM D1, and the comparing step of block L results in a determination of 'yes'.

A case where the comparing step of block L results in a determination of 'yes' will now be described. If the performance of the step of block L results in a determination of 'yes', it is assumed that the 'write' and 'read' operations previously performed at respective blocks G and K were performed without error. Control then passes to block M1 where the microprocessor 2 determines whether or not there are additional DRAMs D1–Dn within the DIMM 14a. This step may be performed in any suitable manner known in the art. By example, between the performance of the steps of blocks L and M1, the microprocessor 2 may perform a step of increasing a value of another counter variable (not shown) stored in memory 3, and may then perform the step of block M1 by comparing this value to a predetermined value (not shown) stored in memory 3 indicating the total number of DRAMs D1–Dn incorporated in the DIMM 14a. If the value of the counter variable is determined to be greater than the predetermined value, indicating that there are no additional DRAMs D1–Dn included in the DIMM 14a ('no' at block M1), then control passes through connector A1 to block N' of FIG. 3c, where a further step is performed in a manner as will be described below. If it is determined that there are additional DRAMs D1–Dn included in the DIMM 14a ('yes' at block M1), then control passes to block M1', where the microprocessor 2 controls another one the delay elements 16a–16n so as place this delay element in its next delay setting. Which one of the delay elements 16a–16n is controlled by the microprocessor 2 at block M1' is not of particular importance, as long as it is not the same delay element as the one previously adjusted by the microprocessor 2 at block J. Thereafter, control passes back to block K and a similar procedure is performed for another one of the DRAMs D1–Dn in the manner described above.

Figure 3C:
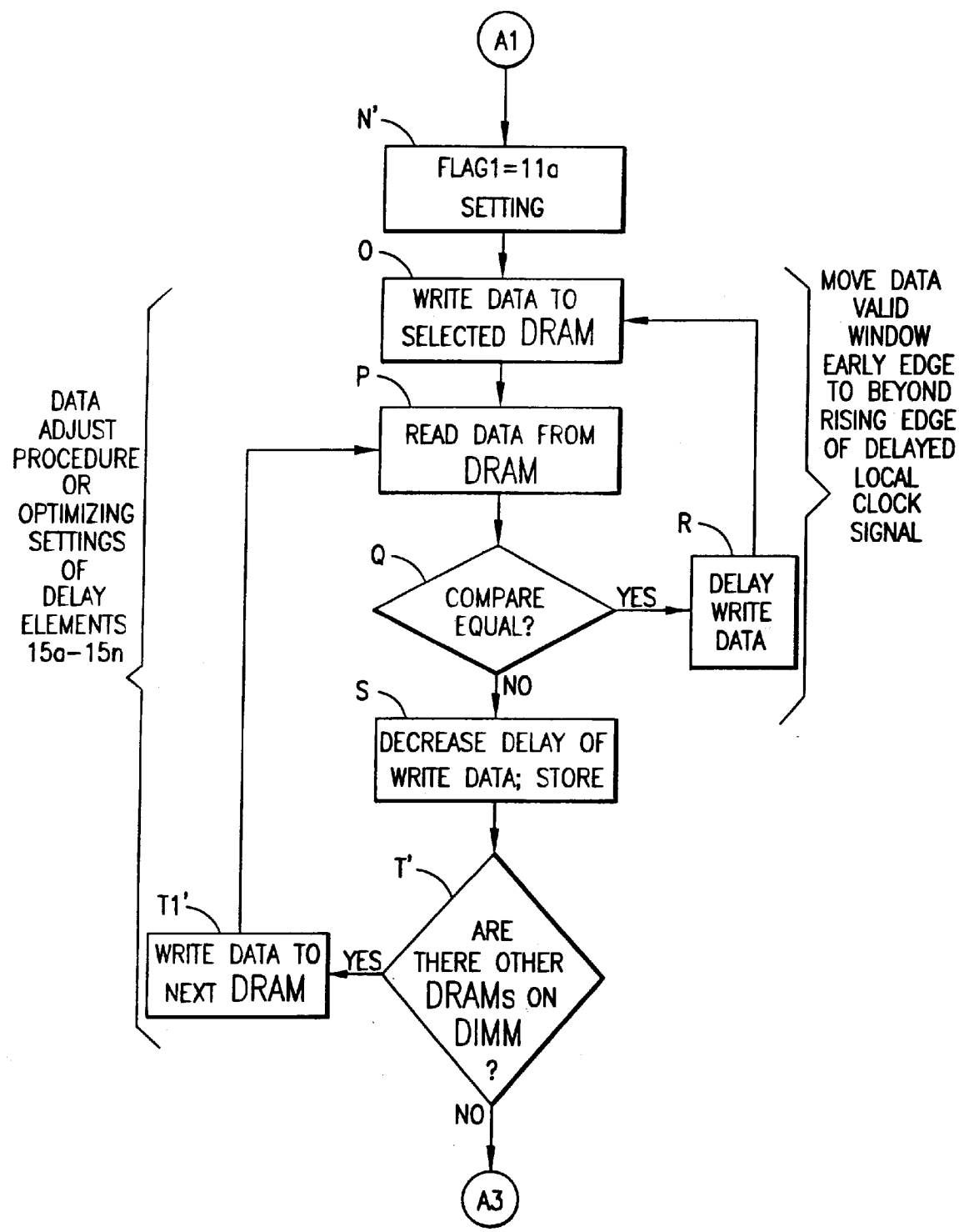
Figure 5:
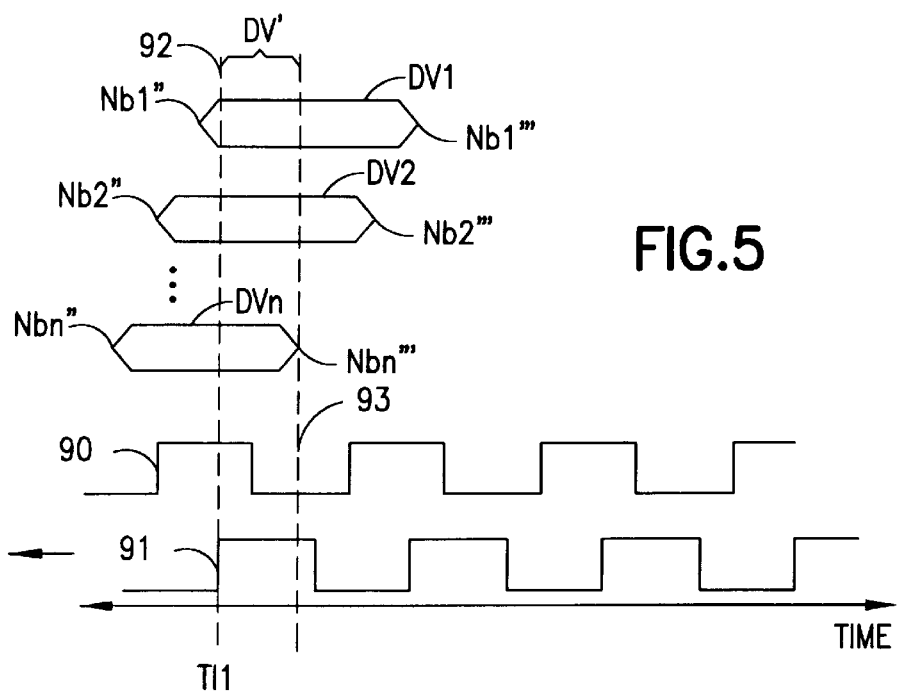
FIGS. 5, 6, and 7 represent exemplary relationships of clock signals employed the memory subsystem of FIG. 1 and various "data valid windows" for states of the memory subsystem corresponding to the beginning of the procedures of FIGS. 3c and 3d, and to an end of the procedures of FIG. 3f, respectively, wherein the data valid windows represent time periods extending between respective first, earliest times at which registers within the memory subsystem may be triggered for enabling data to be read from memory devices of the memory subsystem without error, and respective second, latest times at which the registers may be triggered for enabling data to be read from the memory devices without error.

The performance of the step of block N' of FIG. 3c will now be described. As was previously described, for a case in which the performance of the step identified by block I' of FIG. 3a results in a determination of 'yes', and for a case in which the performance of the step identified by block M1 of FIG. 3b results in a determination of 'no', control passes to block N' of FIG. 3c. Before describing the step performed at block N' in detail, brief reference will first be made to FIG. 5, which represents a state of the memory subsystem 1' prior to the step of block N' being entered. In FIG. 5, blocks DV1–DVn (hereinafter referred to as data "valid windows DV1–DVn" or "temporal ranges DV1–DVn") are shown. Edges Nb1"–Nbn" of the respective data valid windows DV1–DVn represent earliest times at which the respective registers 10a3a–10a3n may be triggered (by applying a positive clock pulse edge thereto), after the initiation of a 'read' operation by the microprocessor 2, and it can be expected that data (Nb1')–(Nbn') being read from the respective DRAMs D1–Dn will be successfully loaded into the respective registers 10a3a–10a3n during the enablement periods of these registers 10a3a–10a3n, for enabling the 'read' operation to be performed without error. Edges Nb1'''–Nbn''' of the respective data valid windows DV1–DVn represent latest times at which the respective registers 10a3a–10a3n may be triggered, after the initiation of a 'read' operation by the microprocessor 2, and it can be expected that data (Nb1')–(Nbn') being read from the respective DRAMs D1–Dn will be successfully loaded into the respective registers 10a3a–10a3n during the enablement periods of these registers 10a3a–10a3n, for enabling the 'read' operation to be performed without error.

Time (TI1) shown in FIG. 5 represents an earliest time, after the initiation of a 'read' operation by the microprocessor 2, at which data being read from all of the DRAMs D1–Dn can be accurately 'sampled'. That is, time (TI1) represents an earliest time, after the initiation of a 'read' operation by the microprocessor 2, at which all of the registers 10a3a–10a3n may be simultaneously triggered, and it can be expected that data (Nb1')–(Nbn') being read from the DRAMs D1–Dn of DIM 14a will be successfully loaded into the respective registers 10a3a–10a3n during enablement periods of these registers 10a3a–10a3n (i.e., without error), even though not all portions of the data (Nb1')(Nbn') may arrive at the respective registers simultaneously. The time (TI1) is also represented by T2' of FIG. 4b, which represents data (Nb1')–(Nbn') received by the registers 10a3a–10a3n, and being loaded into these registers 10a3a–10a3n within enablement period EP2 of the registers 10a3a–10a3n. Referring again to FIG. 5, the line 92 intersecting time (TI1) on the time axis is referred to as a "first side", or "early side", of a data valid window (also referred to as a temporal range) DV' for this case. In accordance with the method of this invention, the performance of the procedures appearing prior to block N' results in a detection of the first side 92 of the data valid window DV'. Before block N' is entered, it is assumed that the delay elements 11a and 16a–16n have delay settings (and the signals output from these delay elements 11a and 16a–16n have temporal relationships) which enable data to be read from the DRAMs D1–Dn without error. FIG. 5 also shows an exemplary depiction of a signal 90, which represents the local clock signal 11' prior to being phase delayed by a respective delay element 16a–16n, and a signal 91, which represents a delayed version of the local clock signal 11' output from the delay element 16a–16n after the procedures appearing prior to block N' are performed. Referring now to FIG. 3c, the step performed at block N' will now be described in detail. At block N' the microprocessor 3 stores information similar to that previously provided by the microprocessor 2 to the delay element 11a at block F, in the memory 3 as variable FLAG1. Also, for each of the following 'read' and 'write' steps, it is assumed that the delay elements 16a–16n are maintained in the delay setting in which they were last placed, until they are further adjusted in accordance with this invention as described below.

After block N', control passes to block O where a procedure referred to as a 'data adjust procedure' is commenced. In this procedure, a "second side", or "late side", of the data valid window DV' is "detected", in a manner as will be described below.

At block O the microprocessor 2 controls the memory controller 1 in the manner described above for writing data (Nb1)–(Nbn) to a memory location ML1–MLn of a selected DRAM D1–Dn incorporated in DIMM 14a. For the purposes of this description, it is assumed that the microprocessor 2 controls the memory controller 1 at block O for writing data (Nb1) to a memory location ML1 of DRAM D1, through elements 10b1, 10a2a, and 8c of the memory controller 1, and bus 104a. Thereafter, at block P the microprocessor 2 operates in conjunction with the memory controller 1 in the above-described manner so as to retrieve data from the memory location ML1 of the DRAM D1. This step is assumed to result in data (Nb1') being provided by the DRAM D1 to the microprocessor 2 through the bus 105a, receiver 9a, and registers 10a3a and 10c1.

Figure 4D:
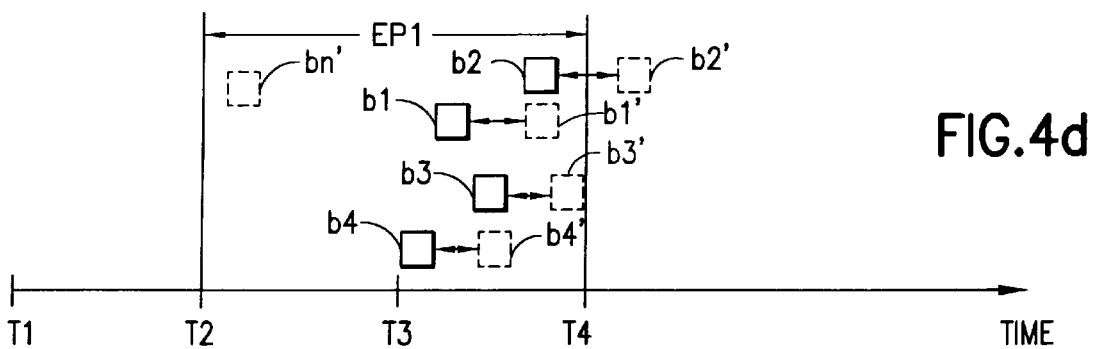

After the step of block P is performed, and the microprocessor 2 receives the data (Nb1') from the register 10c1, the microprocessor 2 compares the received data (Nb1') to the data (Nbb1) stored in the memory 3 to determine whether or not the compared data is similar (block Q). A determination of 'yes' at block Q indicates that the 'write' and 'read' operations performed at blocks O and P were successfully performed without error. An example of a successful 'write' operation is represented in FIG. 4d, where bits b1–b4 of data (Nb1) are received by the DRAM D1 at times which enable the bits b1–b4 to be accepted by the DRAM D1 within an enablement period EP1 of the DRAM D1.

After a determination of 'yes' is made at block Q, control passes to block R where the microprocessor 2 controls the delay element 15a in the manner described above, so as to increment the delay setting of the delay element 15a. Then, the steps of blocks O, P, Q, and R are performed in a similar manner as described above. As long as the performance of the step of block Q results in a determination of 'yes', then the steps of block R, O, and P are continuously performed in the above-described manner. As can be appreciated, each time the delay element 15a is placed in a next delay setting at block R for delaying the local clock signal 11' applied to the register 10a2a, the time at which the register 10a2a, and hence, the times at which the flip-flops FF1–FF4 of register 10a2a, are triggered, are delayed accordingly (i.e., are temporally displaced). As such, the times at which data received at input 10a2a'' of the register 10a2a is loaded into, and subsequently forwarded to DRAM D1, by the register 10a2a, are also delayed accordingly. The continuous performance of the steps of blocks R, O, P, and Q eventually results in at least some portion of the data (Nb1) not being accepted by DRAM D1 within a same enablement period EP1 of DRAM D1 as other portions of the data (Nb1). An example of times at which bits b1'–b4' of the data (Nb1) are received by DRAM D1 relative to the time T2 at which DRAM D1 is triggered in response to receiving a positive edge of a clock pulse over bus 103a, and an example of the enablement period EP1 of the DRAM D1 for this case, is shown in FIG. 4d. These bits b1'–b4' are shown as being temporally displaced relative to bits b1–b4, owing to the delayed triggering of register 10a2a. As can be seen in FIG. 4d, bit b2' of bits b1'–b4' is received by DRAM D1 after the occurrence of the enablement period EP1 of the DRAM D1, and another arbitrary bit bn' is received within the enablement period EP1. As a result, the performance of the 'read' step of block P results in the bits b1', b3', b4', as well as arbitrary bit bn', being collectively loaded in DRAM D1 (rather than bits b1'–b4'), and being subsequently provided to the microprocessor 2 during a 'read' operation of block P. In this case, the subsequent performance of the step of block Q results in a determination of 'no'.

It should be noted that the steps of blocks R, O, P, and Q are performed so as to deliberately cause the delay element 15a to temporally displace the local clock signal applied to the delay element 15a by an amount of temporal displacement which results in a determination of 'no' at block Q (i.e., which results in an occurrence of a write error). In this manner, a subsequent determination can be made of a delay setting of the delay element 15a which causes data to be written to the DRAM D1 without error, as will be described below.

After a determination of 'no' is made at block Q, control passes to block S where the microprocessor 2 provides information to the delay element 15a in the above described manner so as to cause the amount of phase delay provided by delay element 15a to be decremented by the predetermined phase delay amount, thereby reducing the delay setting of the delay element 15a. Also at block S, the microprocessor 2 stores the information in the memory 3 as variable FLAG15a, and it is assumed that the delay element 15a is maintained in the new delay setting until sometime later when it is further adjusted (as will be described below). As a result of the step of block S, if a further operation were to be performed to write data to DRAM D1 via register 10a2a, the register 10a2a would be triggered at a time which would enable bits b1–b4 of the data (Nb1) to be received by the DRAM D1 at times which would enable the bits b1–b4 to be successfully loaded into DRAM D1 within the enablement period EP1 of DRAM D1. This "trigger" time is considered to be a latest time at which register 10a2a can be triggered, and it can be assured that the complete data (Nb1) will be successfully accepted by the DRAM D1 during an occurrence of enablement period EP1 of DRAM D1 (i.e., without error), for storage therein.

After block S, control passes to block T' where it is determined whether or not there are other DRAMs D1–Dn on the DIMM 14a (besides DRAM D1) for which the data adjust procedure needs to be performed. This step may be performed in accordance with any suitable technique (such as one employing a counter variable, as described above).

If 'yes' at block T', the control passes to block T1' where the microprocessor 2 controls the memory controller 1 in the manner described above so as to write data (Nb1)–(Nbn) to a memory location ML1–MLn of another selected one of the DRAMs D1–Dn incorporated in the DIMM 14a. By example, the microprocessor 2 may control the memory controller 1 at block T1' for writing data (Nbn) to a memory location ML1 of DRAM Dn, through the various elements 10bn, 10a2n, 8n, and (N–1)a. Control then passes back to block P, where data (Nbn) is read from this DRAM Dn, and the method proceeds in the manner described above.

Figure 6:
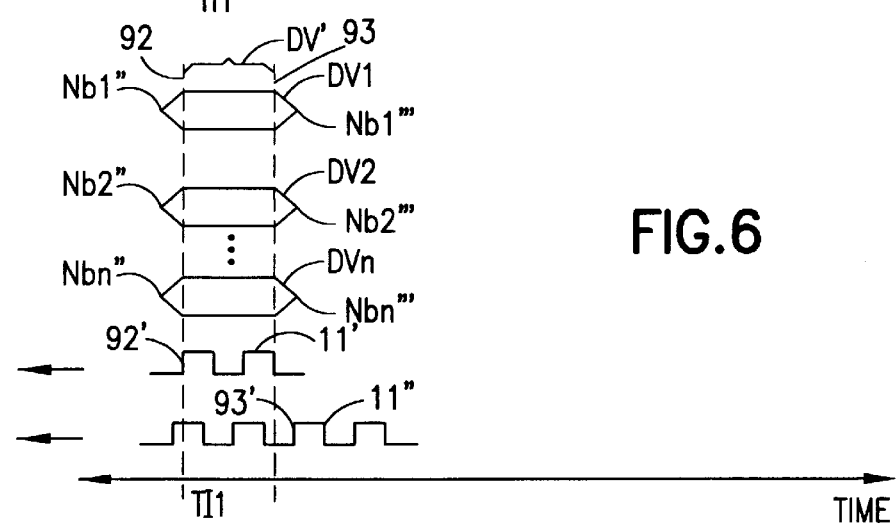

The data adjust procedure steps identified by blocks P, Q, R, S, T', and T1' are performed in the above-described manner so as to adjust the setting of each of the remaining delay elements 15b–15n, and to store information corresponding to these delay settings in the memory 3 as the respective variables FLAG15b–FLAG15n. As a result of the performance of the data adjust procedure described above, optimum delay settings for all of the delay elements 15a–15n are determined, so that in subsequently performed 'write' operations, these delay settings may be employed to enable the registers 15a–15n to be triggered at times which enable the data (Nb1)–(Nbn) to be written to the DRAMs D1–Dn without error (i.e., to enable the registers 15a–15n to be triggered at times which cause the data (Nb1)–(Nbn) to be received by the DRAMs D1–Dn at times which enable the data to be successfully accepted by the DRAMs D1–Dn within enablement periods of the DRAMs D1–Dn). At this point in the procedure, the settings of the delay elements 11a, 15a–15n, and 16a–16n are such that, if a further read operation were to be performed, the registers 10a3a–10a3n would be triggered at an earliest time which would enable data (Nb1')–(Nbn') being read from the DRAMs D1–Dn of DIM 14a to be accepted at the respective registers 10a3a–10a3n during enablement periods of these registers 10a3a–10a3n (i.e., which would enable the data to be read without error). This time is represented by time (TI1) shown in FIG. 6. That is, time (TI1) represents an earliest time at which all of the registers 10a3a–10a3n may be triggered, and it can be expected that data being read from the DRAMs D1–Dn will be read without error. An exemplary relationship between a positive edge 92' of clock signal 11' applied to the respective registers 10a3a–10a3n for such an operation is also represented in FIG. 6.

Figure 3D:
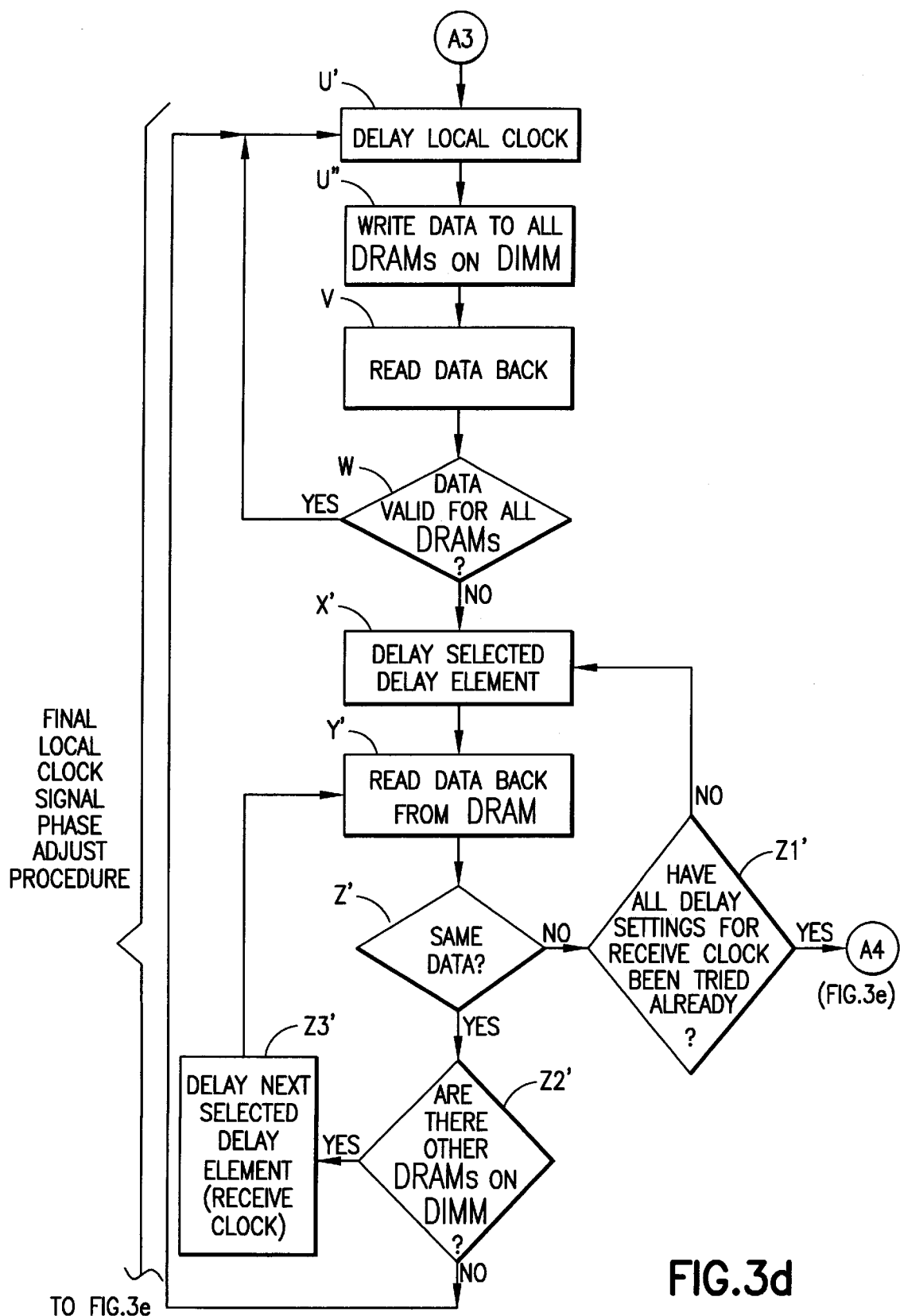

After the data adjust procedure has been performed for all DRAMs D1–Dn of the DIMM 14a ('no' at block T"), control passes through connector A3 to block U' of FIG. 3d, where a 'final local clock phase adjust' procedure is initiated. This procedure is represented by blocks U'-X3, collectively, of FIGS. 3d and 3e. At block U' the microprocessor 2 controls the delay element 11a in the above-described manner so as to increment the delay setting of the delay element 11a, thereby causing a resultant phase delay of the local clock signal 11' forwarded to the DRAMs D1–Dn of DIMM 14a. Then, at blocks U" and V the microprocessor 2 and memory controller 1 operate in conjunction with one another to write data (Nb1)–(Nbn) to the respective DRAMs D1–Dn of DIMM 14a, and to read data (Nb1')–(Nbn') back from these DRAMs D1–Dn. Then, at block W the data (Nb1')–(Nbn') is compared to the data (Nbb1)–(Nbbn) from the memory 3 to determine whether or not the respective, compared data is similar. If 'yes' at block W, then control passes back to block U' where the microprocessor 2 again increments the delay setting of the delay element 11a. Thereafter, the steps indicated by blocks U", V, and W are again performed until the comparing step of block W results in a determination that the data (Nb1')–(Nbn') read back from at least one of the respective DRAMs D1–Dn at block V is not similar to the respective data (Nbb1)–(Nbbn) from the memory 3 ('no' at block W). It should be noted that the steps of blocks U', U", V, and W, are performed to deliberately cause the phase of the local clock signal 11' output from the delay element 11a to be such that an error occurs during the performance of step W. This enables a subsequent determination to be made of a second setting of delay element 11a which causes data to be transferred between devices 1 and D1–Dn without error, as will be described below.

A determination of 'no' at block W indicates that the phase of local clock signal 11' is such that, after the DRAMs D1–Dn are commanded by the microprocessor 2 to provide data to the microprocessor 2 during a 'read' operation, and the DRAMs D1–Dn subsequently respond to receiving this command and respective positive edges of local clock signal 11' by forwarding respective data (Nb1')–(Nbn') to the memory controller 1, at least some portion of the forwarded data (Nb1')–(Nbn') does not reach a respective register 10a3a–10a3n prior to an elapse of an enablement period EP1 of this register, while other portions of the data (Nb1') –(Nbn') are received by the respective register prior to the elapse of enablement period EP1. This is depicted in FIG. 4b, for example, wherein the delaying of the local clock signal 11' at block U' ultimately results in data Nb2' and Nbn' being received at respective registers 10a3b and 10a3n after an occurrence of an enablement period EP1 of these registers 10a3b and 10a3n.

If 'no' at block W, then control passes to block X' where the microprocessor 2 again controls one the delay elements 16a–16n so as to increment the delay setting of this delay element. For the purposes of this description, it is assumed that the delay element controlled by the microprocessor 2 at block X' is delay element 16a.

Thereafter, at block Y' the microprocessor 2 operates in conjunction with memory controller 1 in the above-described manner so as to read data (Nb1') from memory location ML1 of the DRAM D1. Assuming that the step of block Y' results in data (Nb1') being retrieved from the DRAM D1, then at block Z' the microprocessor 2 compares the retrieved data (Nb1') to the data (Nbb1) stored in the memory 3 to determine whether or not the compared data is similar.

A determination of 'yes' at block Z' indicates that, as a result of the step of block X', which caused the triggering of an enablement period of register 10a3a to be delayed, all of the bits b1–b4 of the data (Nb1') forwarded to the register 10a3a were received at register 10a3a at times which enabled the bits b1–b4 to be loaded into the register 10a3a during delayed enablement period EP1' of the register 10a3a, as is represented in FIG. 4c. If 'yes' at block Z', then control passes to block Z2' where the microprocessor 2 determines whether or not there are additional DRAMs D1–Dn on the DIMM 14a for which the steps of blocks X'–Z1' need to be performed. This step may be performed in accordance with any suitable technique known in the art, such as one employing a counter variable, as described above.

If 'yes' at block Z2', then control passes to block Z3' where the microprocessor 2 increments the delay setting of another, selected one of the delay elements 16a–16n (besides the one adjusted previously at block X'). Thereafter, control passes back to block Y' where the method proceeds in the above-described manner. If 'no' at block Z2', then control passes back up to block U' (FIG. 3d) where the method continues in the above-described manner.

Figure 4E:
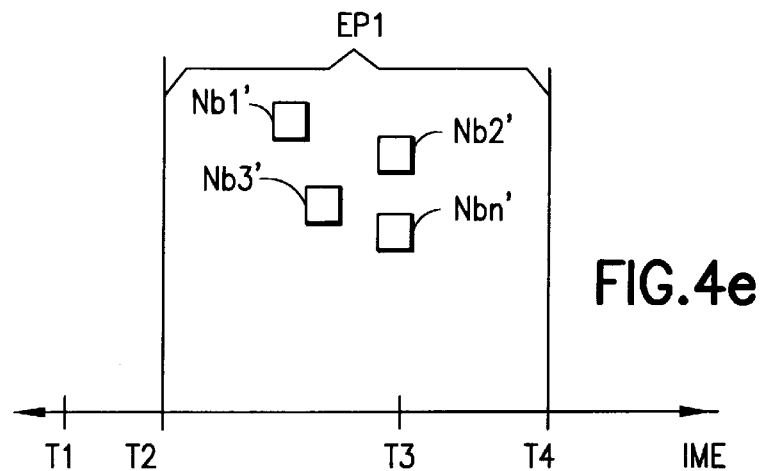
FIG. 4e depicts another exemplary relationship between times at which enablement periods for memory devices of the memory subsystem of FIG. 1 occur, relative to times at which data is received by these memory devices.
Figure 4F:
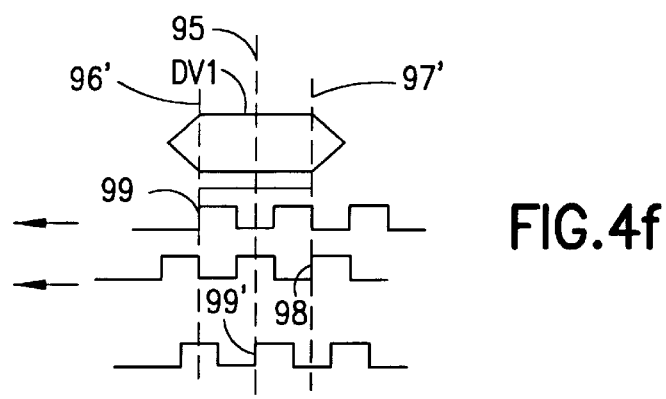
FIG. 4f represents an exemplary relationship between clock signals employed in the memory subsystem of FIG. 1 and a "data valid window", the data valid window representing a time period that extends between a first, earliest time at which register components within the memory subsystem may be triggered for enabling data to be read from memory devices of the memory subsystem without error, and a second, latest time at which the register components may be triggered for enabling data to be read from the memory devices without error.
Figure 4G:
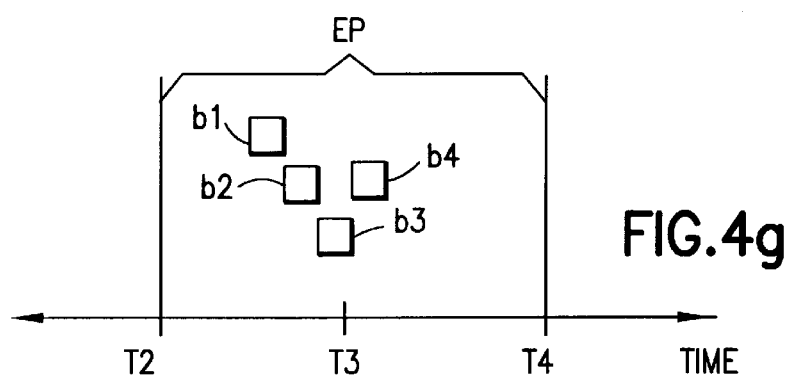
FIGS. 4g and 4h depict further exemplary relationships between times at which enablement periods for register components of the memory subsystem of FIG. 1 occur, relative to times at which bits of data are received by these register components.
Figure 4H:
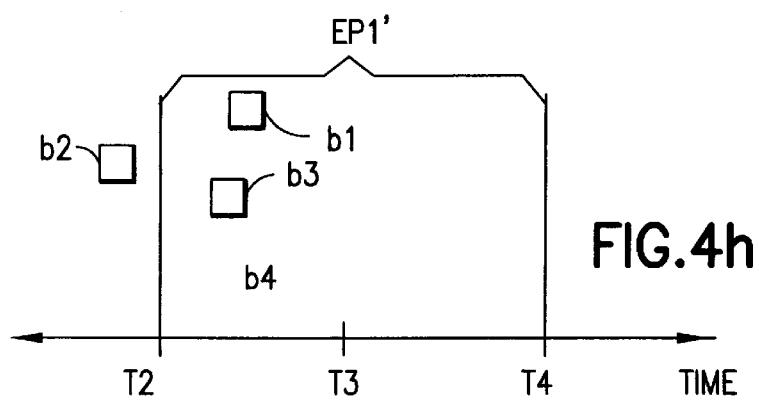

A case where a determination of 'no' is made at block Z' will now be described. A determination of 'no' at block Z' indicates that, after the DRAM D1 forwarded data (Nb1') along the bus 105a in response to receiving a positive edge 93' (FIG. 6) of local clock signal 11' during the step of block Y', at least some portion of the data (Nb1'), such as a bit b2 of the data (Nb1'), was not received at the register 10a3a at a time which enabled the bit b2 to be loaded into the register 10a3a during an enablement period (EP1') of the register 10a3a, as is represented in FIG. 4h. In this case, it can be said that the phase of the local clock signal 11" output from delay element 11a is such that positive edge 93' of the signal 11" is no longer "within" an extent of the data valid windows DV1–DVn, as is represented in FIG. 6. That is, the phase of the local clock signal 11" output from delay element 11a is such that data is not able to be read from the DRAM D1 without error.

After a determination of 'no' is made at block Z', control passes to block Z1' where the microprocessor 2 determines whether or not the delay element 16a has been adjusted through each of its delay settings since the step of block X' was first entered. If 'no' at block Z1', then control passes back to block X' where the microprocessor 2 increments the delay setting of delay element 16a, and the method then proceeds in the above-described manner. If 'yes' at block Z1', then control passes through connector A4 to block X" of FIG. 3e, where a further step is performed.

Figure 3E:
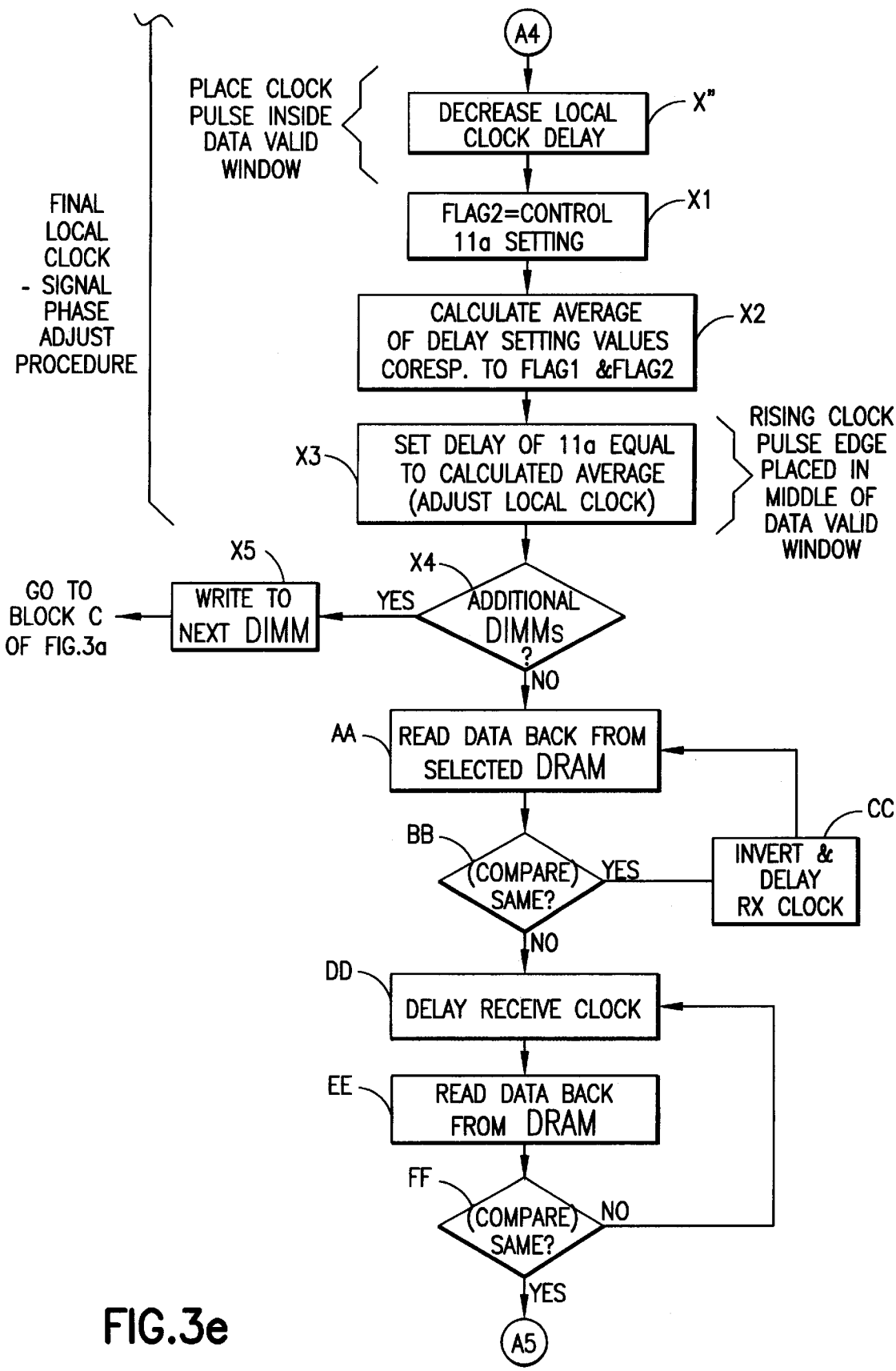
Figure 3F:
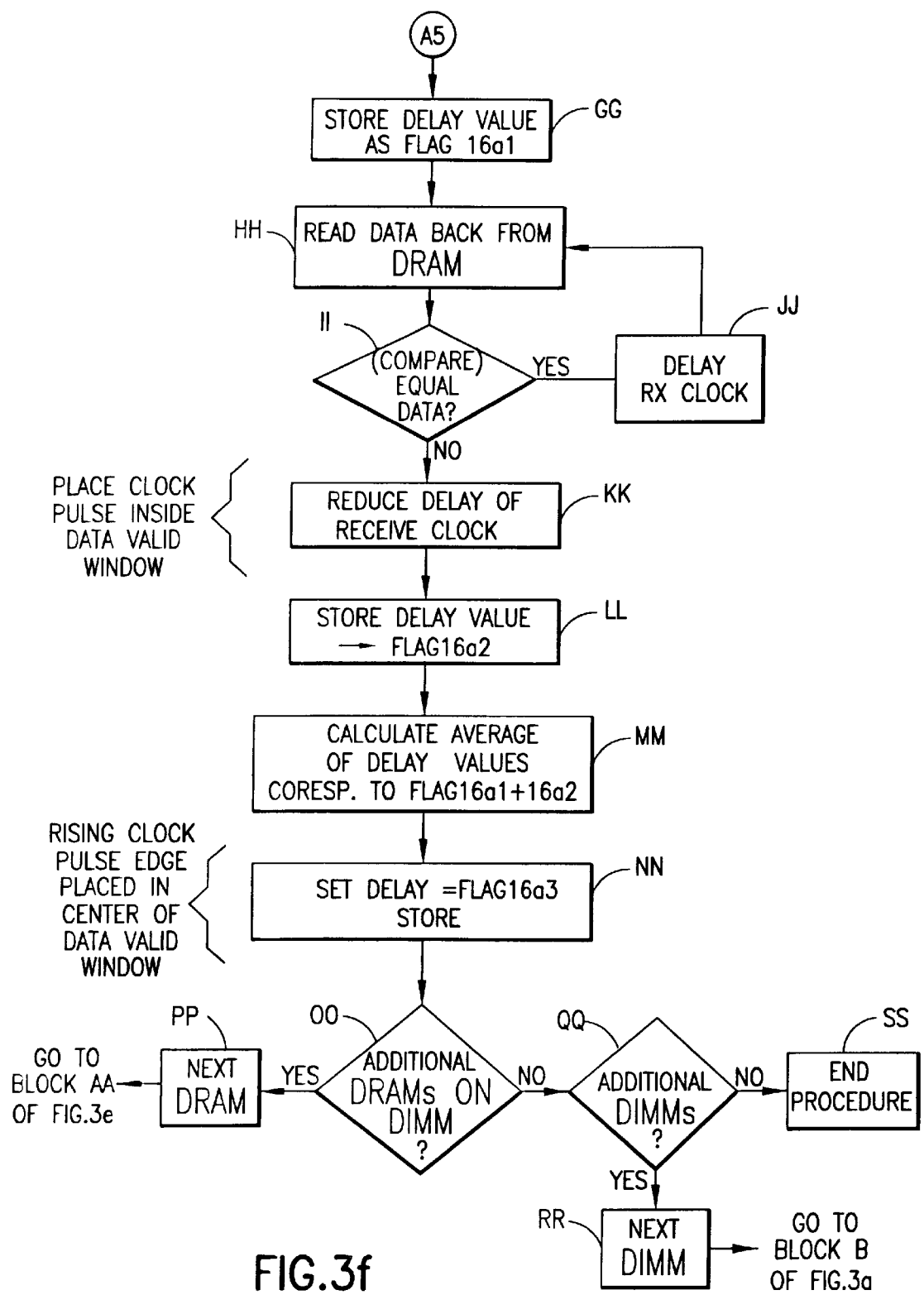
Figure 7:
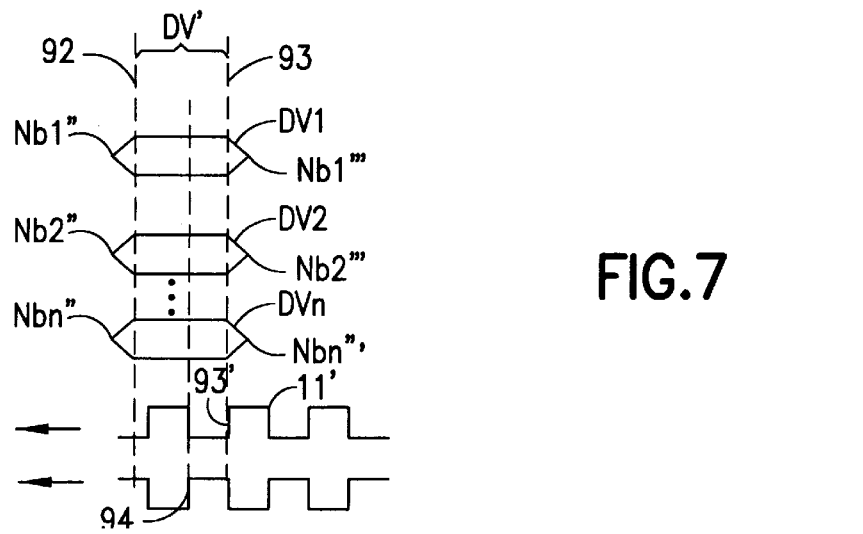
Figure 8:
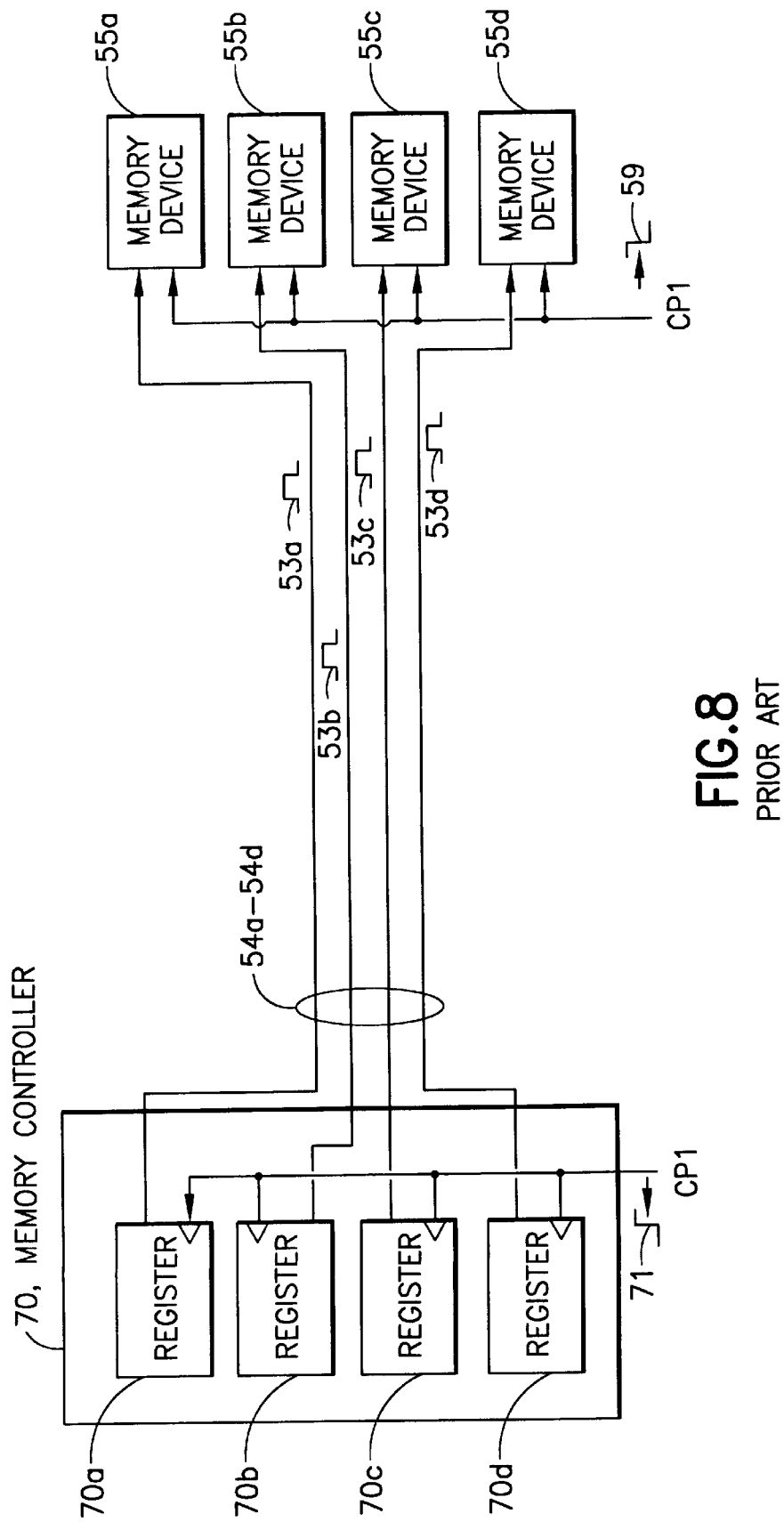
FIG. 8 shows a memory controller and memory device components of a conventional memory subsystem of a typical computer system.

The step performed at block X' of FIG. 3e will now be described. At block X" the microprocessor 2 provides information to the delay element 11a (through delay element input 11a') for causing the delay setting of the delay element 11a to be reduced to a next, lesser delay setting. Then, the microprocessor 2 stores this information in the memory 3 as variable FLAG2 (block X1). The performance of the step of block X" results in the delayed local clock signal 11' output from delay element 11a having a phase such that, if a further read operation were to be performed in the above-described manner, data (Nb1')–(Nbn') forwarded from DRAMs D1–Dn would be successfully accepted by the respective registers 10a3a–10a3a during the enablement periods of the registers 10a3a–10a3n, thereby enabling the 'read' operation to be performed without error. As such, it can be said that a second side, or "late side" 93, of the data valid window DV', is detected. FIG. 7 shows an exemplary relationship between a positive edge 93' of the signal 11' output from delay element 11a, relative to the second side 93 of data valid window DV'. The second side 93 of the data valid window DV' represents a latest time (during a read operation) at which all of the registers 10a3a–10a3n may be triggered, and it can be expected that data being read from the DRAMs D1–Dn will be read without error.

After the step of block X1 is performed, control passes to block X2 where the microprocessor 2 retrieves the information stored as the variables FLAG1 and FLAG2. After retrieving the information from these variables, the microprocessor 2 correlates this information to the corresponding information stored in data table T1, and then retrieves the phase delay setting values associated with this information from data table T1. Thereafter, microprocessor 2 performs an algorithm for determining an average of the retrieved phase delay setting values. By example, it is assumed that the information stored as variable FLAG1 indicates '1000000000' and that the information stored as variable FLAG2 indicates '1111111000'. In this case, after retrieving the information '1000000000' and '1111111000' from the respective FLAG1 and FLAG2 variables, the microprocessor 2 correlates the retrieved information to the corresponding command information in data table T1 specifying '1000000000' and '1111111000'. The microprocessor 2 then retrieves corresponding phase delay setting values V2 (e.g., V2=(2T/10)) and V8 (e.g., V8=(8T/10)) from the data table T1, and performs an algorithm for determining an average value (AV) of the retrieved delay setting values V2 and V8. In this example, the algorithm may be in accordance with the following equation (EQ1):

$$(AV)=((V2)+(V8))/2 \qquad (EQ1)$$

Figure 2D:
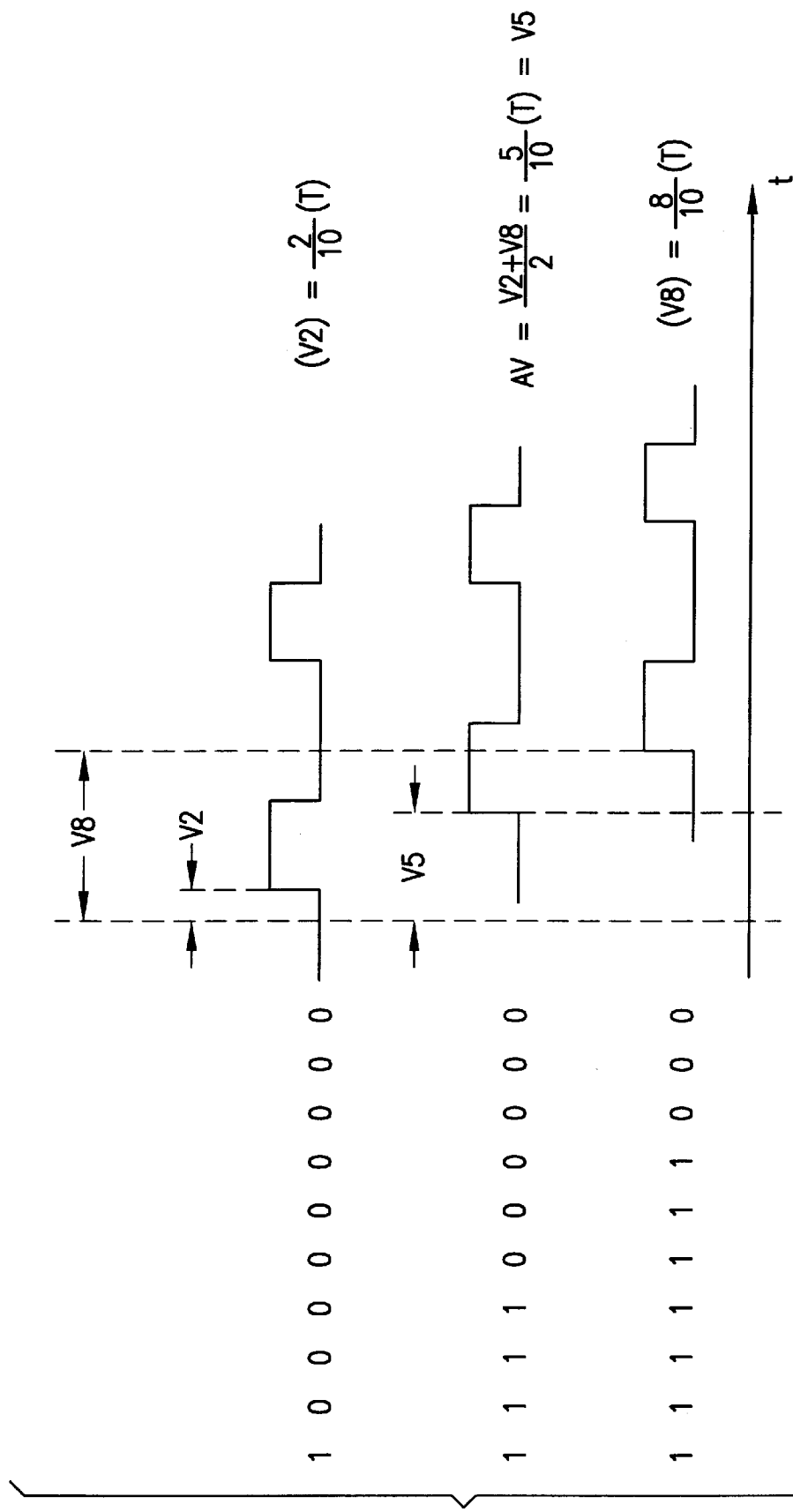
FIG. 2d depicts another example of various clock signals employed in the memory subsystem of FIG. 1, after having been temporally displaced by delay elements of the memory subsystem of FIG. 1.

Referring to FIG. 2d, it can be appreciated that the performance of the algorithm defined by equation (EQ1) results in a determination that the average value (AV) equals phase delay value V5 which, in this example, corresponds to command information specifying '1111000000' stored in the data table T1.

After the step of block X2 is performed, control passes to block X3 where the microprocessor 2 retrieves from the data table T1 the command information corresponding to the average delay setting value determined in block X2, and loads this information into variable FLAG3. By example, and assuming that the average value (AV) calculated in block X2 equals phase delay value V5, then at block X2 the microprocessor 2 retrieves the command information specifying '1111000000' from data table T1, and then loads this information into variable FLAG3. Also by example, and assuming that the average value (AV) calculated in block X2 equals some value that is between V5 and V6 (e.g., a value which is an average of phase delay values V1 and V11), then the microprocessor 2 may retrieve the command information specifying '1111000000', which immediately precedes the information '1111000000' in data table T1, or, alternatively, the next command information (specifying '1111100000') appearing after the information '1111000000' in the data table T1, for storing this information as variable FLAG3.

Also at block X3, the microprocessor 2 provides the retrieved command information to the input 11a' of delay element 11a so as to place the delay element 11a in a delay setting corresponding to the information. As a result, the signal (identified by 11") output from delay element 11a is phase delayed relative to the signal 11' originally applied to delay element 11a. By example, assuming that the information provided to the delay element 11a specifies '1111000000', then the performance of the step of block X3 results in the delay element 11a phase delaying the signal 11" by an amount of delay equivalent to value V5.

The performance of the step of block X3 results in the signal 11" output from delay element 11a, and subsequently applied to the DRAMs D1–Dn, having a phase such that, if a further 'write' operation were to be performed in the above-described manner, data (Nb1)–(Nbn) written from the memory controller 1 would eventually be received by the respective DRAMs D1–Dn at times that would enable the data (Nb1)–(Nbn) to be successfully loaded into the DRAMs D1–Dn within an enablement period EP1 of the collective DRAMs D1–Dn (the enablement period of the DRAMs D1–Dn occurring in response to respective positive edges of the signal 11' being applied to the respective DRAMs Dl-Dn). This is depicted in FIG. 4e, and the phase delay setting of the delay element 11a after block X3 is considered to be an optimum phase setting for the delay element 11a. With this phase setting of the delay element 11a, it can be said that the phase of signal 11" output therefrom is such that a positive edge 93' of the signal is aligned with a "center" 95 of the data valid window DV', as represented in FIG. 7. In this stage of the procedure, as long as the signal 11" is not temporally displaced by an amount which extends beyond "edges" of a temporal range defined by lines 92 and 93 in FIG. 7, 'read' and 'write' operations can be performed within the memory subsystem 1' without error.

Referring again to FIG. 3e, after the step of block X3 is performed, control passes to block X4. At block X4, the microprocessor 2 determines whether or not there are additional DIMMs coupled to the memory controller 1. This step may be performed in accordance with any suitable technique known in the art, such as one employing a counter variable, as described above.

If 'yes' at block X4, then control passes to block X5 where the microprocessor 2 controls the memory controller 1 in the manner described above so as to write data to a memory location ML1–MLn of all DRAMs D1–Dn incorporated in a next, selected one of the DIMMs 14n—14n, besides DIMM 14a. Thereafter, control passes back to block C of FIG. 3a where the method proceeds in the above described manner for the next, selected DIMM 14a–14n.

If 'no' at block X4, indicating that the procedures described above have been performed for all of the DIMMs 14a–14n within the subsystem 1', then control passes to block AA where a procedure is initiated for optimizing the performance of 'read' operations performed within the subsystem 1'.

At block AA the microprocessor 2 operates in conjunction with the memory controller 1 in the above-described manner so as to read data (Nb1')–(Nbn') from a memory location ML1–MLn of a DRAM D1–Dn from a particular DIMM 14a–14n. For the purposes of this description, it is assumed that the 'reading' step of block AA is performed so that data (Nb1') from memory location ML1 of DRAM D1 from DIMM 14a, is read by the microprocessor 2. Thereafter, the microprocessor 2 compares the data (Nb1') to the data (Nbb1) stored in the memory 3 to determine whether or not the compared data is similar (block BB). If 'yes' at block BB, then control passes to block CC where the microprocessor 2 controls the delay element 16a in the manner described above so as to place the delay element 16a in its next delay setting, for phase delaying the signal 11' applied to the delay element 16a, and for causing this signal 11 to be inverted. Then, control passes back to block AA, where the method proceeds in the above-described manner. The steps of blocks AA, BB, and CC are performed continuously until it is determined at block BB that the data (Nb1') read back from the DRAM D1 differs from the stored data (Nbb1) ('no' at block BB), indicating that the data (Nb1') was not successfully read from DRAM D1. By example, an indication of 'no' at block BB may indicate that, as a result of the step of block CC, at least some bits b1–b4 of the data (Nb1') were not completely accepted by the register 10a3a at block AA, during an enablement EP1 period of the register, as represented in FIG. 4c. It should be noted that the steps of blocks AA, BB, and CC are performed to deliberately cause the phase of the signal output from the delay element 16a to be such that the step of block BB results in a determination of 'no' (i.e., such that a read error occurs). This enables a subsequent determination to be made of a first setting of delay element 16a which causes data to be read from DRAM D1 without error, as will be described below.

After a determination of 'no' is made at block BB, control passes to block DD where the microprocessor 2 provides information to the delay element 16a in the manner described above so as to cause the delay element 16a to be placed in its next delay setting. Then, at block EE the microprocessor 2 again operates in conjunction with the memory controller 1 so as to 'read' data (Nb1') from memory location ML1 of DRAM D1. The microprocessor 2 then compares the data (Nb1') to the data (Nbb1) stored in the memory 3 to determine whether or not the compared data (Nb1') and (Nbb1) is similar (block FF).

If 'no' at block FF, then control passes back to block DD, and the steps of blocks DD, EE, and FF are again performed until it is determined at block FF that the data (Nb1') read back from the DRAM D1 is similar to the stored data (Nbb1) ('yes' at block FF). By example, owing to step DD, which delays the time at which the register 10a3a is triggered (i.e., which temporally displaces an occurrence of the enablement period of the register 10a3a), it eventually occurs that all of the bits b1–b4 of data (Nb1') read at block EE are accepted by the register 10a3a during a "delayed" enablement EP1' period of the register 10a3a, as represented in FIG. 4c. A determination of 'yes' at block FF indicates that a determination has been made of an earliest time at which the register 10a3a may be triggered for being enabled (during a read operation initiated at block EE), and it can be expected that data (Nb1') being read from DRAM D1 will be received at register 10a3a at a time which would enable the data (Nb1') to be successfully loaded into the register 10a3a during the period of enablement of the register 10a3a (i.e., it can be expected that the data (Nb1') will be read without error). The "earliest time" at which the register 10a3a may be triggered in this case is represented by a first side, or "early side", 96' of a data valid window DV1 in FIG. 4f, the data valid window DV1 of FIG. 4f representing a temporal "window" defining an extent of time within which the register 10a3a may be triggered, during a read operation initiated at block EE, and it can be expected that data (Nb1') being read from DRAM D1 will be read without error. FIG. 4f also shows an exemplary relationship between a positive edge 99 of the signal output from delay element 16a to register 10a3a, relative to first side 96' of data valid window DV1.

Referring again to FIG. 3e, a case where a determination of 'yes' is made at block FF will now be described. If 'yes' at block FF, then control passes through connector A5 to block GG of FIG. 3f, where the microprocessor 2 stores the information previously provided to the delay element 16a at block DD in the memory 3 as variable FLAG16a1. Control then passes to blocks HH and II where reading and comparing steps similar to those of blocks EE and FF described above are performed.

If the performance of block II results in a determination that data (Nb1') read from DRAM D1 is similar to stored data (Nbb1) ('yes' at block II), then control passes to block JJ where the microprocessor 2 places the delay element 16a in its next phase delay setting. Thereafter, control passes to block HH. The steps of block HH, II, and JJ are performed until it is determined that the data (Nb1') read from the DRAM D1 differs from the data (Nbb1) stored in memory 3 ('no' at block II). By example, owing to step JJ, which delays the time at which the register 10a3a is triggered (i.e., which delays an occurrence of the enablement period of the register 10a3a), it eventually occurs that at least some of the bits b1–b4 of data (Nb1') read at block HH, such as bit b1, are not accepted by the register during a "delayed" enablement period EP1" of the register, since the register 10a3a is triggered (in response to receiving a positive edge of a clock pulse) too "late" for enabling bit b1 to be accepted by register 10a3a during period EP1", as represented in FIG. 4c.

After a determination has been made that the data (Nb1') read from the DRAM D1 differs from the data (Nbb1) stored in memory 3 ('no' at block II), control passes to block KK where the microprocessor 2 provides information to the delay element 16a to cause the delay element 16a to be placed in a next, lesser delay setting. This step results in the delayed local clock signal 11' output from delay element 16a having a phase such that, if a further read operation were to be performed so as to retrieve data (Nb1'), all bits b1–b4 of the data (Nb1') would be received by register 10a3a at times which would allow the bits b1–b4 to be successfully loaded into the register 10a3a within an enablement period of the register 10a3a, such as enablement period EP1" (FIG. 4c). Also, the phase setting of delay element 16a is such that, if a further read operation were to be performed, the signal output from the delay element 16a to register 10a3a would cause the delay element 16a to be triggered at a latest possible time that allows for the successful performance of a read operation (i.e., at a latest time that allows the read operation to be performed without error). The "latest time" at which the register 10a3a may be triggered in this case is represented by a "late side" 97' of the data valid window DV1 in FIG. 4f. FIG. 4f also shows an exemplary relationship between a positive edge 98 of the signal output from delay element 16a to register 10a3a, relative to late side 97' of data valid window DV1.

The microprocessor 2 then stores the information provided to the delay element 16a at block KK in the memory 3 as variable FLAG16a2 (block LL). Control then passes to block MM where the microprocessor 2 retrieves the information stored as the variables FLAG16a1 and FLAG16a2. After retrieving the information from these variables, the microprocessor 2 correlates this information to the corresponding information stored in data table T1, and then retrieves the phase delay setting values associated with this information from data table T1. Thereafter, microprocessor 2 performs an algorithm to determine an average of the retrieved phase delay setting values (block MM) in the above described manner. By example, assuming that the information retrieved from variables FLAG16a1 and FLAG16a2 indicate '1000000000' and '1111111000', respectively, and that the microprocessor 2 correlates the retrieved information to the corresponding command information and associated delay setting values from the data table T1, then the performance of the algorithm results in a determination that the average of the delay setting values equals delay value V5, which corresponds to command information specifying '1111000000' stored in the data table T1.

After the step of block MM is performed, control passes to block NN where the microprocessor 2 retrieves from the data table T1 the command information (e.g., '1111000000') corresponding to the average delay setting value determined in block MM. Also at block NN, the microprocessor 2 stores the retrieved information in the memory 3 as variable FLAG16a3, and also places delay element 16a in a setting corresponding to the retrieved information (for subsequently performed 'read' operations). By example, the microprocessor 2 may provide information such as '1111000000' to the delay element 16a for placing the delay element in a delay setting corresponding to phase delay value V5.

The delay setting in which the delay element 16a is placed at block NN is considered to be an optimum delay setting for the delay element 16a. In subsequently performed 'read' operations, this delay setting causes the signal output from delay element 16a to trigger (enable) register 10a3a at a time which results in all bits of the data (Nb1') being 'read' from DRAM D1 being successfully loaded into the register 10a3a within a duration of a same enablement period of the register 10a3a. This is represented in FIG. 4g. With this phase setting of the delay element 16a, it can be said that the phase of the signal output from delay element 16a is such that a positive edge 99' of the signal is aligned with a "center" 95' of the data valid window DV1, as represented in FIG. 4f. As long as the phase of this signal is not temporally displaced by an amount that extends beyond "edges" of a temporal range defined by lines 96' and 97' in FIG. 4f, 'read' operations can be performed within the memory subsystem 1' without error. After block NN is performed, control passes to block OO where the microprocessor 2 determines whether or not there are additional DRAMs D1–Dn on the DIMM 14a for which the steps of blocks AA–NN need to be performed, in a manner as was described above. If 'yes' at block OO, then a next DRAM D1–Dn of DIMM 14a is selected (block PP), and control passes back to block AA where the above-described steps AANN are performed for this selected DRAM D1–Dn.

If 'no' at block 00, it is assumed that all of the delay elements 16a–16n have been placed in their optimum settings, in the manner described above. Then control passes to block QQ where the microprocessor 2 determines whether or not there are additional DIMMs 14a–14n for which the steps of blocks AA-NN need to be performed for the DRAMs D1–Dn of these DIMMs 14a–14n, in a similar manner as was described above. If 'yes' at block QQ, then it is assumed that microprocessor 2 selects a next one of the DIMMs 14a–14n (block RR), and control passes back to block B of FIG. 3a where the procedures of steps B–NN are performed in the above-described manner for DRAMs D1–Dn of the selected DIMM 14a–14n.

Assuming that a determination of 'no' is made by the microprocessor 2 at block QQ, then the procedure of the invention is terminated (block SS), and it is assumed that the delay elements 11a, 15a–15n, and 16a–16n are all placed in settings which optimize the performance of the memory control system 1'.

In accordance with this invention, the method set forth in FIGS. 3a–3f is performed during the initial 'start-up' of the computer system 1", and lasts no more than 50 ns. After the system 1" is 'powered-up', and during 'write' and 'read' operations required to be performed during subsequent computer system 1" operations, the microprocessor 2 controls the various delay elements 11*a*, 15*a*–15*n*, and 16*a*–16*n* using the information stored as the various variables FLAG3, FLAG15*a*–FLAG15*n*, and FLAG16*a*3–FLAG16*n*3, for causing these delay elements 11*a*, 15*a*–15*n*, and 16*a*–16*n* to be placed in their 'optimum' settings. By example, it is assumed that an operation being performed by the microprocessor 2 of the computer system 1" requires that data be written to a memory location ML1–MLn of the DRAMs D1–Dn of each DIMM 14*a*–14*n*. In this case, the microprocessor 2 retrieves the information stored as the various variables FLAG3 and FLAG15*a*–FLAG15*n*, and provides this information to the various, corresponding delay elements 11*a*, 15*a*–15*n* of each block 110*a*–110*n*, so as to cause these respective delay elements 11*a* and 15*a*–15*n* to be placed in the delay settings corresponding to the provided information. The microprocessor 2 also operates in conjunction with the memory controller 1 in the above-described manner so as to write the data (Nb1)–(Nbn) to the memory location ML1–MLn of the DRAMs D1–Dn of each DIMM 14*a*–14*n*. As can be appreciated, because the delay elements 11*a* and 15*a*–15*n* of each block 110*a*–110*n* are placed in their 'optimum' settings, data (Nb1)–(Nbn) forwarded from the memory controller to DRAMs D1–Dn of each DIMM 14*a*–14*n* is received by the DRAMs D1–Dn at times which enable the data (Nb1)–(Nbn) to be successfully loaded (i.e., loaded without error) into the respective DRAMs D1–Dn within an enablement period of the DRAM D1–Dn.

A similar operation is performed for 'read' operations, except that in these cases, the microprocessor 2 provides the information from variables FLAG3 and FLAG16*a*3–FLAG16*an* to the various delay elements 11*a*, 16*a*–16*n* of each block 110*a*–110*n*, so as to cause these respective delay elements 11*a* and 16*a*–16*n* to be placed in their corresponding, 'optimum' settings. During such 'read' operations, the microprocessor 2 operates in conjunction with the memory controller 1 in the above-described manner so as to read data from DRAMs D1–Dn of one or more DIMMs 14*a*–14*n*. As can be appreciated, because the delay elements 11*a* and 16*a*–16*n* of each block 110*a*–110*n* are placed in their 'optimum' settings, data (Nb1)–(Nbn) forwarded to the memory controller 1 from the DRAMs D1–Dn of each DIMM 14*a*–14*n* is received by the registers 10*a*3*a*–10*a*3*n* of each block 110*a*–110*n* at times which enable the data (Nb1)–(Nbn) to be successfully loaded into the registers 10*a*3*a* within an enablement period of the registers 10*a*3*a*–10*a*3*n*, for being subsequently forwarded to the microprocessor 2 without error.

Being that the method of the invention places the delay elements 11*a*, 15*a*–15*n*, and 16*a*–16*n* in optimum settings in the above-described manner, the method compensates for any differences in times at which portions of data being transferred between the memory controller 1 and the DRAMs D1–Dn of the various DIMMs 14*a*–14*n*, arrive at the respective components 1 and D1–Dn. As a result, 'read' and 'write' operations are performed within the subsystem 1' without error, and the overall processing speed of the memory control system 1' (and of the computer system 1" in general) is increased relative to that of the prior art memory control systems described above.

It should be noted that, after the method of the invention is performed for a first time the system 1" is powered up, the information stored as the variables FLAG3, FLAG15*a*–FLAG15*n*, and FLAG16*a*3–FLAG16*an* in accordance with the invention may be stored permanently in the memory 3 (or registers within device 1). Also, for this case it is within the scope of the invention to subsequently employ this information to optimize the temporal relationships between the clock signals employed for reading and writing data, for subsequent cases in which the system 1" is powered up.

It should also be noted that in one embodiment of the invention, the phase of the clock signal applied to register 10*a*1 through input 10*a*1' is the same as the phase of the clock signal provided to the DIMM 14*a* over bus 103*a*, owing to the fact that the input 10*a*1' and bus 103*a* are both connected to the output of delay element 11*a*. This feature ensures that data 10' output by register 10*a*1 through bus 102*a* is eventually received at the DRAMs D1–Dn at a time which enables the data 10' to be loaded into the DRAMs D1–Dn during an enablement period of the respective DRAMs D1–Dn (i.e., the data 10' is received at the DRAMs D1–Dn simultaneously with a positive edge of the clock signal 11"). It should also be noted that, in view of the above description, one skilled in the art would appreciate that a technique similar to that described above for optimizing the times at which data is written from the registers 10*a*2*a*–10*a*2*n* to the DRAMs D1–Dn (i.e., the technique for optimizing the settings of the delay elements 15*a*–15*n*), may also be employed to optimize the times at which data 10' is provided to the DRAMs D1–Dn.

It should further be noted that in one embodiment of the invention, the memory 3 and data table T1 may be incorporated within the memory controller 1, such as within registers of the memory controller 1. This embodiment enables information stored in the devices 3 and T1 to be readily accessed when needed, and minimizes data retrieval latency.

Moreover, it should be noted that, although the invention is described in the context of employing DIMMs and DRAMs, other types of memory modules and memory storage devices may also be employed, such as Synchronous DRAM Double Data Rate (SDRAM-DDR) memory modules and memory storage devices, or Synchronous DRAM (SDRAM) memory modules and memory storage devices.

Also, although the invention is herein described in the context of employing data nibbles, other suitable types of information (e.g., binary information other than nibbles) may also be employed. Moreover, the data nibbles (Nb1)–(Nbn) provided to the separate DRAMs D1–Dn of DIMM 14*a* during write operations may be similar to one another, or different from one another, depending on applicable performance criteria.

It is also noted that in cases wherein SDRAM-DDR memory modules and memory storage devices are employed, typical DDR mode operations are such that the data 10' is provided to the DRAMs D1–Dn over bus 102*a* at half the frequency (i.e., the local clock signal frequency) as that of data provided over, for example, the buses 104*a*–(N–1)*a*, and 105*a*–N*a*. For the purposes of this invention, however, this frequency differential is not critical, and the data provided over the respective buses 102*a*, 104*a*–(N–1)*a*, and 105*a*–N*a*, may be provided using any clock signal frequency. It is further emphasized that the above-described procedures can be performed regardless of the particular memory configuration (e.g., board layout) employed in the system 1", and regardless of whether or not the DRAMs D1–Dn and/or DIMMs 14*a*–14*n* are manufactured by different manufacturers. In addition to overcoming latency resulting from bus length variations, the technique of the invention may also be performed to overcome latency resulting from other factors that may be present within the system 1', such as latency which results from data loading variations on the buses.

Furthermore, although the invention is described in the context of employing registers, flip-flops, and memory devices that are enabled in response to receiving positive edges of clock signal pulses, it should be appreciated that other types of logic devices may also be employed, such as, for example, those which are enabled in response to receiving negative edges of clock signal pulses.

Moreover, it should be note that the method of the invention is not limited to being used only in a memory subsystem of a computer system, as described above. That is, the method of the invention may also be employed to optimize the exchange of information between any suitable types of communicating devices (e.g., master and slave devices), such as devices employed in synchronous communication systems wherein one device controls one or more subservient devices.

Having described the various aspects of the invention, it can be appreciated that the invention provides a method wherein steps are performed of providing at least one clock pulse having a leading pulse edge and a trailing pulse edge. In the method, first data is transmitted from a first location (e.g., memory controller 1) to a second location (e.g., DRAMs D1–Dn) in accordance with the at least one clock pulse. The first data has a leading edge and a trailing edge, and there is a leading phase between the leading edge of the first data and the leading pulse edge. Also, there is a trailing phase between the trailing edge of the first data and the trailing pulse edge. After the first data is received at the second location, further steps are performed of transmitting second data from the second location to the first location, and comparing the first and second data to determine if there are any errors in the second data. If there are errors in the second data, a further step is performed of varying the leading phase and the trailing phase to determine values thereof defining a bounded relationship between the at least one clock pulse and the first data within which the first data can be transmitted substantially without error. After the varying step is performed, a further step is performed of transferring further first data between the first and second locations using the bounded relationship.

While the invention has been particularly shown and described with respect to preferred embodiments thereof, it will be understood by those skilled in the art that changes in form and details may be made therein without departing from the scope and spirit of the invention.

What is claimed is:

1. A method for initiating a start-up operation of a system, the system having a master device and a slave device, the method comprising steps of:

exercising the slave device using the master device to determine a range within which temporal relationships of electrical signals need to be set in order to operate the system without error; and setting the temporal relationships of the electrical signals so as to be within the determined range;

wherein the electrical signals include first and second electrical signals, and wherein the exercising step includes steps of:

applying the first electrical signals to the master device for generating second electrical signals;

applying the second electrical signals to the slave device;

transferring information between the master device and the slave device in accordance with temporal relationships between the second electrical signals;

varying the temporal relationships between first predetermined ones of the second electrical signals to determine upper and lower bounds of the range within which the temporal relationships need to be set in order for the information to be transferred from the slave device to the master device without error; and wherein the setting step includes setting the temporal relationships between the second electrical signals so as to be between the upper and lower bounds.

2. A method as set forth in claim 1, and further comprising a step of storing a record of the determined range for subsequent use in operating said system.

3. A method as set forth in claim 1, wherein the step of varying includes a step of programming a plurality of programmable delay elements so as to vary the temporal relationships between the second electrical signals.

4. A method as set forth in claim 1, further comprising a step of varying temporal relationships between second predetermined ones of the second electrical signals to determine a relationship that causes the information to be transferred from the master device to the slave device without error.

5. A method as set forth in claim 4, and further comprising steps of:

setting the temporal relationships between the second predetermined ones of the electrical signals to the relationship determined to cause the information to be transferred from the master device to the slave device without error; and further varying the temporal relationships between the first predetermined ones of the second electrical signals to determine revised upper and lower bounds of the range within which the temporal relationships need to be set in order for the information to be transferred from the slave device to the master device without error.

6. A method as set forth in claim 1, wherein the master device includes a memory controller and wherein the slave device includes at least one memory device.

7. A data processing system, said data processing system comprising:

at least one memory device; and memory control means, said memory control means being responsive to a start-up condition of said system for generating electrical signals to exercise the at least one memory device for setting a timing of said electrical signals so as to enable data to be stored in and read from the at least one memory device without error;

wherein the electrical signals include first and second electrical signals and wherein the system further comprises:

circuitry for applying the first electrical signals to the memory control means for generating second electrical signals;

circuitry for applying the second electrical signals to the memory device;

circuitry for transferring information between the memory control means and the memory device in accordance with temporal relationships between the second electrical signals;

circuitry for varying the temporal relationships between first Predetermined ones of the second electrical signals to determine upper and lower bounds of the range within which the temporal relationships need to be set in order for the information to be transferred from the memory device to the memory control means without error; and circuitry for setting the temporal relationships between the second electrical signals so as to be between the upper and lower bounds.

8. A data processing system as set forth in claim 7, wherein said memory control means is also for storing a record of the timing of said electrical signals.

9. A data processing system as set forth in claim 8, wherein said memory control means further comprises:

means for generating the first electrical signals in response to said start-up condition;

an output port; and at least one circuit block interposed between an output of said generating means and said output port, said at least one circuit block being responsive to said first electrical signals for generating said second electrical signals for applying said second electrical signals to said at least one memory device through said output port, wherein said at least one circuit block comprises at least one programmable delay element.

10. A data processing system as set forth in claim 7, wherein the memory control means comprises a memory controller and wherein the at least one memory device comprises a plurality of memory devices included in at least one memory module.

11. A data processing system as set forth in claim 7, wherein the at least one memory device comprises at least one Dynamic Random Access Memory (DRAM) device.

12. A data processing system as set forth in claim 7, wherein the at least one memory device comprises at least one Synchronous Dynamic Random Access Memory (SDRAM) device.

13. A method for transmitting data from a first location to a second location in an electronic system, the method comprising steps of:

providing at least one clock pulse having a leading pulse edge and a trailing pulse edge from a clock which controls signals at said first location and at said second location;

transmitting first data from said first location to said second location in accordance with said at least one clock pulse, said first data having a leading edge and a trailing edge, there being a leading phase between said leading edge of said first data and said leading pulse edge, there also being a trailing phase between said trailing edge of said first data and said trailing pulse edge;

after the first data is received at the second location, transmitting second data from said second location to said first location;

comparing said first and second data to determine if there are any errors in said second data; and if there are any errors in said second data, varying said leading phase and said trailing phase to determine values thereof defining a bounded relationship between said at least one clock pulse and said first data within which the first data can be transferred from said first location to said second location substantially without error.

14. A method according to claim 13, wherein after the varying step is performed, a further step is performed of transferring further first data between the first and second locations using said bounded relationship.

15. An apparatus for transmitting data from a first location to a second location in an electronic system, said apparatus comprising:

means for providing at least one clock pulse having a leading pulse edge and a trailing pulse edge from a clock which controls signals at said first location and at said second location;

means for transmitting first data from said first location to said second location in accordance with said at least one clock pulse, said first data having a leading edge and a trailing edge, there being a leading phase between said leading edge of said first data and said leading pulse edge, there being a trailing phase between said trailing pulse edge and said trailing edge of said first data; means for transmitting second data from said second location to said first location;

means for comparing said first and second data to determine if there are any errors in said second data; and means for varying said leading phase and said trailing phase to determine values thereof defining a bounded relationship between said at least one clock pulse and said first data within which said first data can be transmitted substantially without error.

16. An apparatus according to claim 15, wherein said means for transmitting first data subsequently transfers further first data from said first location to said second location using said bounded relationship.

* * * * *